US012656940B2

(12) United States Patent
Wang et al.

(10) Patent No.: US 12,656,940 B2
(45) Date of Patent: Jun. 16, 2026

(54) DATA PROCESSING METHOD AND APPARATUS, DEVICE, MEDIUM, AND PROGRAM PRODUCT

(71) Applicant: TENCENT TECHNOLOGY (SHENZHEN) COMPANY LIMITED, Shenzhen (CN)

(72) Inventors: Hui Wang, Shenzhen (CN); Wen Zha, Shenzhen (CN); Kai Li, Shenzhen (CN); Weizhou Jiang, Shenzhen (CN); Jie Da, Shenzhen (CN); Hongfa Qiu, Shenzhen (CN); Qiang Lu, Shenzhen (CN); Zhihao Chen, Shenzhen (CN); Jin Jiang, Shenzhen (CN); Xucheng Tang, Shenzhen (CN); Junjie Zhou, Shenzhen (CN); Manqi Lin, Shenzhen (CN); Meng Zuo, Shenzhen (CN); Shijie Wu, Shenzhen (CN); Yongwen Liu, Shenzhen (CN); Zhipeng Wei, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 349 days.

(21) Appl. No.: 18/450,802

(22) Filed: Aug. 16, 2023

(65) Prior Publication Data

US 2023/0393722 A1      Dec. 7, 2023

Related U.S. Application Data

(63) Continuation of application No. PCT/CN2022/130281, filed on Nov. 7, 2022.

(30) Foreign Application Priority Data

Jan. 24, 2022   (CN) .......................... 202210081766.1

(51) Int. Cl.
G06F 3/04845      (2022.01)
G06F 3/0481      (2022.01)
H04L 51/10      (2022.01)

(52) U.S. Cl.
CPC ........ *G06F 3/04845* (2013.01); *G06F 3/0481* (2013.01); *H04L 51/10* (2013.01)

(58) Field of Classification Search
CPC .............. G06F 3/04845; G06F 3/0481; G06F 3/04842; H04L 51/10; H04L 51/04; H04L 51/52
See application file for complete search history.

(56) References Cited

U.S. PATENT DOCUMENTS

2017/0093785 A1    3/2017  Kll et al.
2019/0204924 A1    7/2019  Modarres et al.
          (Continued)

FOREIGN PATENT DOCUMENTS

CN        108563326 A    9/2018
CN        109104641 A    12/2018
          (Continued)

OTHER PUBLICATIONS

The World Intellectual Property Organization (WIPO) International Search Report for PCT/CN2022/130281 Jan. 19, 2023 6 Pages (including translation).

(Continued)

*Primary Examiner* — Angie Badawi
(74) *Attorney, Agent, or Firm* — Anova Law Group, PLLC

(57)      ABSTRACT

A data processing method includes, in response to an interaction message being displayed on an interaction interface, displaying a virtual object in an interaction area in which the interaction message is located, and displaying a resource object at a target location on the interaction interface. The (Continued)

virtual object and the resource object are associated with the interaction message, and the resource object and the virtual object are configured to interact with each other. The method further includes displaying, on the interaction interface, interactive movement involving the virtual object and the resource object. The interactive movement includes moving the virtual object from a location of the interaction area, and/or moving the resource object from the target location.

18 Claims, 25 Drawing Sheets

(56)                References Cited

U.S. PATENT DOCUMENTS

| | | | |
|---|---|---|---|
| 2020/0349938 A1 | 11/2020 | Hwang et al. | |
| 2021/0299581 A1* | 9/2021 | Wu | A63F 13/332 |
| 2023/0082021 A1* | 3/2023 | Gal | H04L 51/046 |
| | | | 715/757 |

FOREIGN PATENT DOCUMENTS

| | | | |
|---|---|---|---|
| CN | 111083505 A | 4/2020 |
| CN | 112672175 A | 4/2021 |
| CN | 112748974 A | 5/2021 |
| CN | 112748975 A | 5/2021 |
| CN | 112799766 A | 5/2021 |
| CN | 113730907 A | 12/2021 |
| CN | 113888677 A | 1/2022 |
| JP | 2015069367 A | 4/2015 |
| JP | 2018206322 A | 12/2018 |
| WO | 2015186534 A1 | 12/2015 |

OTHER PUBLICATIONS

The Japan Patent Office (JPO) Notice of Reasons for Refusal for Application No. 2024-529892 Jun. 24, 2025 10 Pages (including translation).
The Japan Patent Office (JPO) Notice of Reasons for Refusal for Application No. 2024-529892 Oct. 21, 2025 10 Pages (including translation).

* cited by examiner

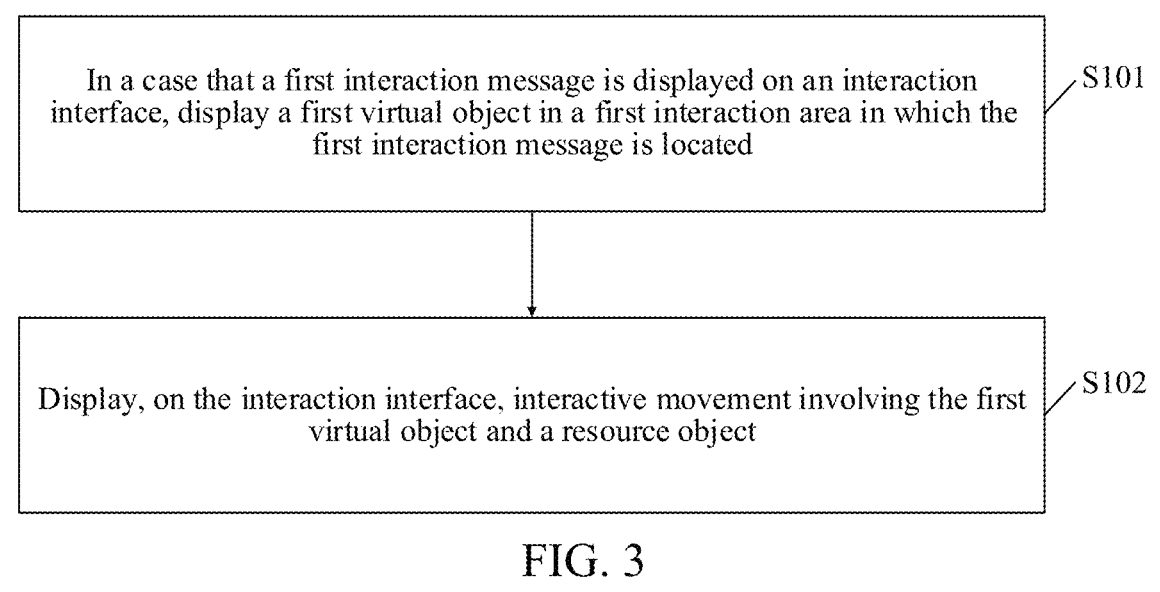

In a case that a first interaction message is displayed on an interaction interface, display a first virtual object in a first interaction area in which the first interaction message is located          S101

Display, on the interaction interface, interactive movement involving the first virtual object and a resource object          S102

FIG. 3

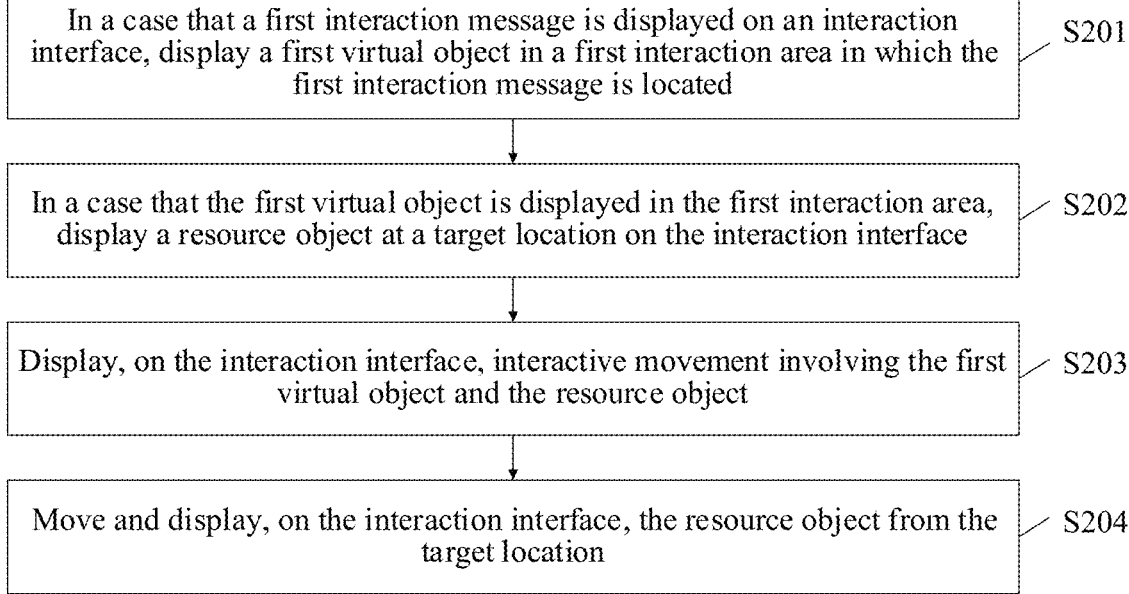

In a case that a first interaction message is displayed on an interaction interface, display a first virtual object in a first interaction area in which the first interaction message is located                                    S201

In a case that the first virtual object is displayed in the first interaction area, display a resource object at a target location on the interaction interface                S202

Display, on the interaction interface, interactive movement involving the first virtual object and the resource object                S203

Move and display, on the interaction interface, the resource object from the target location                S204

FIG. 5

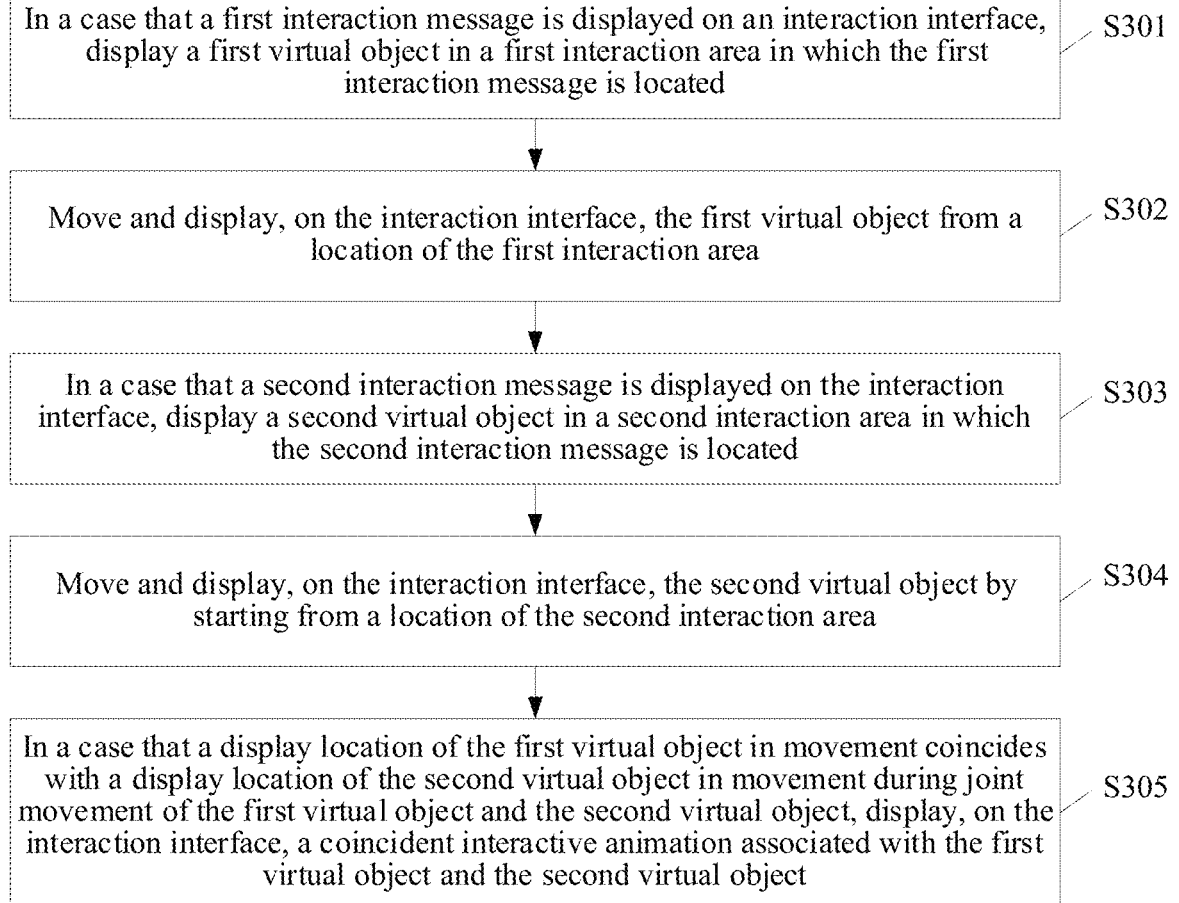

In a case that a first interaction message is displayed on an interaction interface, display a first virtual object in a first interaction area in which the first interaction message is located ⟋ S301

Move and display, on the interaction interface, the first virtual object from a location of the first interaction area ⟋ S302

In a case that a second interaction message is displayed on the interaction interface, display a second virtual object in a second interaction area in which the second interaction message is located ⟋ S303

Move and display, on the interaction interface, the second virtual object by starting from a location of the second interaction area ⟋ S304

In a case that a display location of the first virtual object in movement coincides with a display location of the second virtual object in movement during joint movement of the first virtual object and the second virtual object, display, on the interaction interface, a coincident interactive animation associated with the first virtual object and the second virtual object ⟋ S305

FIG. 13

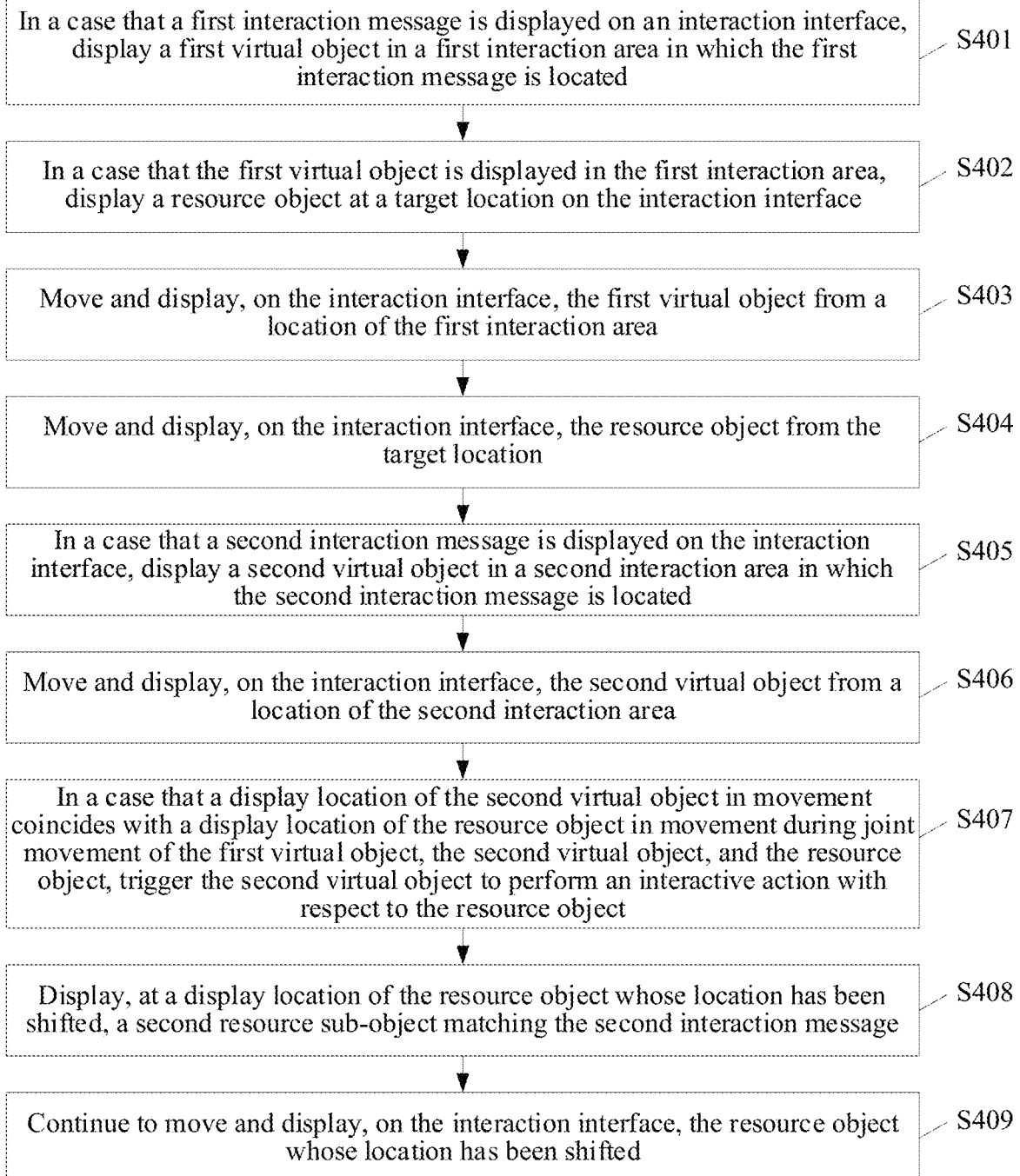

In a case that a first interaction message is displayed on an interaction interface, display a first virtual object in a first interaction area in which the first interaction message is located    S401

In a case that the first virtual object is displayed in the first interaction area, display a resource object at a target location on the interaction interface    S402

Move and display, on the interaction interface, the first virtual object from a location of the first interaction area    S403

Move and display, on the interaction interface, the resource object from the target location    S404

In a case that a second interaction message is displayed on the interaction interface, display a second virtual object in a second interaction area in which the second interaction message is located    S405

Move and display, on the interaction interface, the second virtual object from a location of the second interaction area    S406

In a case that a display location of the second virtual object in movement coincides with a display location of the resource object in movement during joint movement of the first virtual object, the second virtual object, and the resource object, trigger the second virtual object to perform an interactive action with respect to the resource object    S407

Display, at a display location of the resource object whose location has been shifted, a second resource sub-object matching the second interaction message    S408

Continue to move and display, on the interaction interface, the resource object whose location has been shifted    S409

FIG. 16

DATA PROCESSING METHOD AND APPARATUS, DEVICE, MEDIUM, AND PROGRAM PRODUCT

CROSS-REFERENCE TO RELATED APPLICATIONS

This application is a continuation of International Application No. PCT/CN2022/130281, filed on Nov. 7, 2022, which claims priority to Chinese Patent Application No. 202210081766.1, entitled "DATA PROCESSING METHOD AND APPARATUS, COMPUTER DEVICE, AND READABLE STORAGE MEDIUM" filed with the China National Intellectual Property Administration on Jan. 24, 2022, which are incorporated herein by reference in their entirety.

FIELD OF THE TECHNOLOGY

This application relates to the field of communications technologies, and in particular, to data processing.

BACKGROUND OF THE DISCLOSURE

During message interaction, if it is identified that an interaction message can trigger generation of a virtual object, a virtual object (for example, a virtual object D) associated with the interaction message (for example, an interaction message X) is displayed on an interaction interface in a form of emoticon rain. For example, when the interaction message X is "Happy Birthday," the virtual object D having a "cake" pattern may be dynamically displayed on the interaction interface.

However, when virtual objects are dynamically displayed in a form of emoticon rain, for same interaction messages transmitted by different objects, virtual objects corresponding to the interaction messages are always displayed by using a same presentation animation. Consequently, a virtual object display mode is monotonous.

SUMMARY

In accordance with the disclosure, there is provided a data processing method including, in response to an interaction message being displayed on an interaction interface, displaying a virtual object in an interaction area in which the interaction message is located, and displaying a resource object at a target location on the interaction interface. The virtual object and the resource object are associated with the interaction message, and the resource object and the virtual object are configured to interact with each other. The method further includes displaying, on the interaction interface, interactive movement involving the virtual object and the resource object. The interactive movement includes moving the virtual object from a location of the interaction area, and/or moving the resource object from the target location.

Also in accordance with the disclosure, there is provided a computer device including one or more memories storing one or more computer programs, and one or more processors configured to execute the one or more computer programs to, in response to an interaction message being displayed on an interaction interface, display a virtual object in an interaction area in which the interaction message is located, and display a resource object at a target location on the interaction interface. The virtual object and the resource object are associated with the interaction message, and the resource object and the virtual object are configured to interact with each other. The one or more processors are further configured to execute the one or more computer programs to display, on the interaction interface, interactive movement involving the virtual object and the resource object. The interactive movement includes moving the virtual object from a location of the interaction area, and/or moving the resource object from the target location.

Also in accordance with the disclosure, there is provided a computer-readable storage medium storing one or more computer programs that, when executed by one or more processors, cause the one or more processor performs to, in response to an interaction message being displayed on an interaction interface, display a virtual object in an interaction area in which the interaction message is located, and display a resource object at a target location on the interaction interface. The virtual object and the resource object are associated with the interaction message, and the resource object and the virtual object are configured to interact with each other. The one or more computer programs further cause the one or more processors to display, on the interaction interface, interactive movement involving the virtual object and the resource object. The interactive movement includes moving the virtual object from a location of the interaction area, and/or moving the resource object from the target location.

BRIEF DESCRIPTION OF THE DRAWINGS

FIG. 3 is a schematic flowchart of a data processing method according to an embodiment of this application.

FIG. 5 is a schematic flowchart of a data processing method according to an embodiment of this application.

FIG. 13 is a schematic flowchart of a data processing method according to an embodiment of this application.

FIG. 16 is a schematic flowchart of a data processing method according to an embodiment of this application.

DESCRIPTION OF EMBODIMENTS

The following clearly and completely describes the technical solutions in the embodiments of this application with reference to the accompanying drawings in the embodiments of this application. Apparently, the described embodiments are only some but not all of the embodiments of this application. All other embodiments obtained by a person of ordinary skill in the art based on the embodiments of this application without creative efforts shall fall within the protection scope of this application.

In this disclosure, processes or steps described in a certain order do not have to be performed in the order they are described, and can be performed in a different order or simultaneously.

Figure 1:
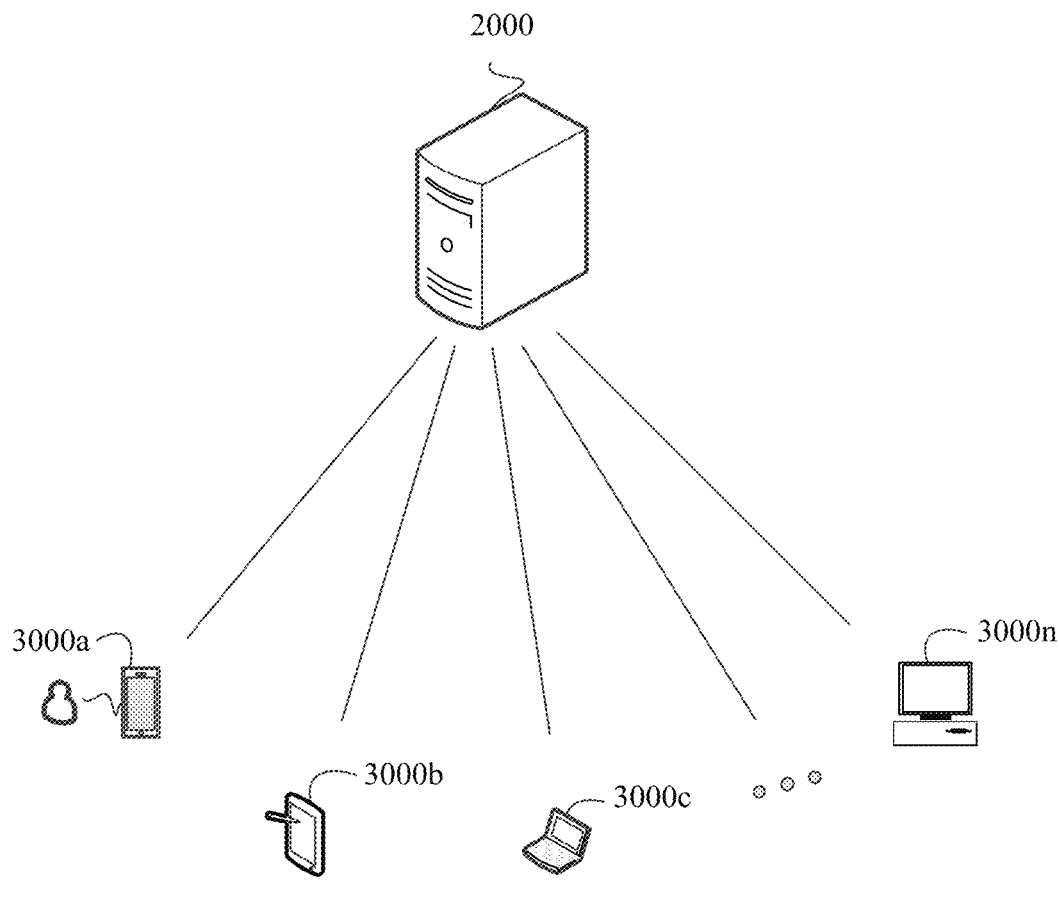
FIG. 1 is a schematic structural diagram of a network architecture according to an embodiment of this application.

Specifically, FIG. 1 is a schematic structural diagram of a network architecture according to an embodiment of this application. As shown in FIG. 1, the network architecture may include a service server 2000 and a terminal device cluster. The terminal device cluster may include one or more terminal devices. A quantity of terminal devices in the terminal device cluster is not limited herein. As shown in FIG. 1, a plurality of terminal devices may include a terminal device 3000a, a terminal device 3000b, a terminal device 3000c, . . . , and a terminal device 3000n. The terminal device 3000a, the terminal device 3000b, the terminal device 3000c, . . . , and the terminal device 3000n each may establish a direct or indirect network connection to the service server 2000 through wired or wireless communication, so that each terminal device can exchange data with the service server 2000 through the network connection.

Each terminal device in the terminal device cluster may include an intelligent terminal with a data processing function, such as a wearable device, a smartphone, a tablet computer, a notebook computer, a desktop computer, a smart household device, or a vehicle-mounted terminal. It is to be understood that each terminal device in the terminal device cluster shown in FIG. 1 may be integrated with an application client. When running on each terminal device, the application client may exchange data with the service server 2000 shown in FIG. 1. Specifically, the application client may include a client with a data processing function, such as a vehicle-mounted client, a smart household client, an entertainment client (for example, a game client), a multimedia client (for example, a video client), a social client, or an information client (for example, a news client). The vehicle-mounted terminal may be an intelligent terminal in an intelligent traffic scenario, and an application client on the vehicle-mounted terminal may be the foregoing vehicle-mounted client.

The service server 2000 shown in FIG. 1 may be a server corresponding to the application client. The service server 2000 may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a CDN, big data, and an artificial intelligence platform.

The foregoing servers and terminal devices are all computer devices, and a data processing method provided in the embodiments of this application may be performed by a computer device.

It can be understood that, in the embodiments of this application, a terminal device corresponding to a first object may be referred to as a first terminal, and an application client integrated in the first terminal may be referred to as a first client. In the embodiments of this application, any terminal device in the foregoing terminal device cluster may be selected as the first terminal. For example, in the embodiments of this application, the terminal device 3000a in the foregoing terminal device cluster may serve as the first terminal. It is to be understood that the first object in the embodiments of this application may be a user who transmits an interaction message through the first client, that is, a message sender.

It can be understood that, in the embodiments of this application, a terminal device corresponding to a second object may be referred to as a second terminal, and an application client integrated in the second terminal may be referred to as a second client. In the embodiments of this application, any terminal device in the foregoing terminal device cluster may be selected as the second terminal. For example, in the embodiments of this application, the terminal device 3000b in the foregoing terminal device cluster may serve as the second terminal. It is to be understood that the second object in the embodiments of this application may be a user who receives an interaction message through the second client, that is, a message recipient.

It is to be understood that the first object in the embodiments of this application may serve as either the message sender or the message recipient, and the second object in the embodiments of this application may serve as either the message recipient or the message sender. In a case that the first object serves as the message sender, the first terminal may transmit an interaction message to the second terminal through the service server 2000, so that the second object corresponding to the second terminal becomes the message recipient. In a case that the second object serves as the message sender, the second terminal may transmit an interaction message to the first terminal through the service server 2000, so that the first object corresponding to the first terminal becomes the message recipient.

For ease of understanding, an interaction message transmitted by the first object (for example, an object Y1) on the first client may be referred to as a first interaction message in the embodiments of this application, and an interaction message received by the first (for example, object Y1) on the first client may be collectively referred to as a second interaction message in the embodiments of this application. Correspondingly, an interaction message received by the second object (for example, an object Y2) on the second client may also be referred to as a first interaction message in the embodiments of this application, and an interaction message transmitted by the second object (for example, object Y2) on the second client may also be referred to as a second interaction message in the embodiments of this application.

It is to be understood that the embodiments of this application may be applied to a service scenario of triggering interactive emoticon rain on an interaction interface, and the first interaction message and the second interaction message may be used for triggering interactive emoticon rain on an application client. The interactive emoticon rain may indicate that a single user triggers emoticon rain by using an interaction message. Multi-user triggering may produce linkage effects, to implement social interaction between emoticon rain, and enhance fun. The interactive emoticon rain, as an Easter egg of a chat, can bring users a sense of surprise in a daily chat, and create a sense of atmosphere on some special days. In addition, the form of interaction shortens a distance between users in a conversation.

Figure 2A:
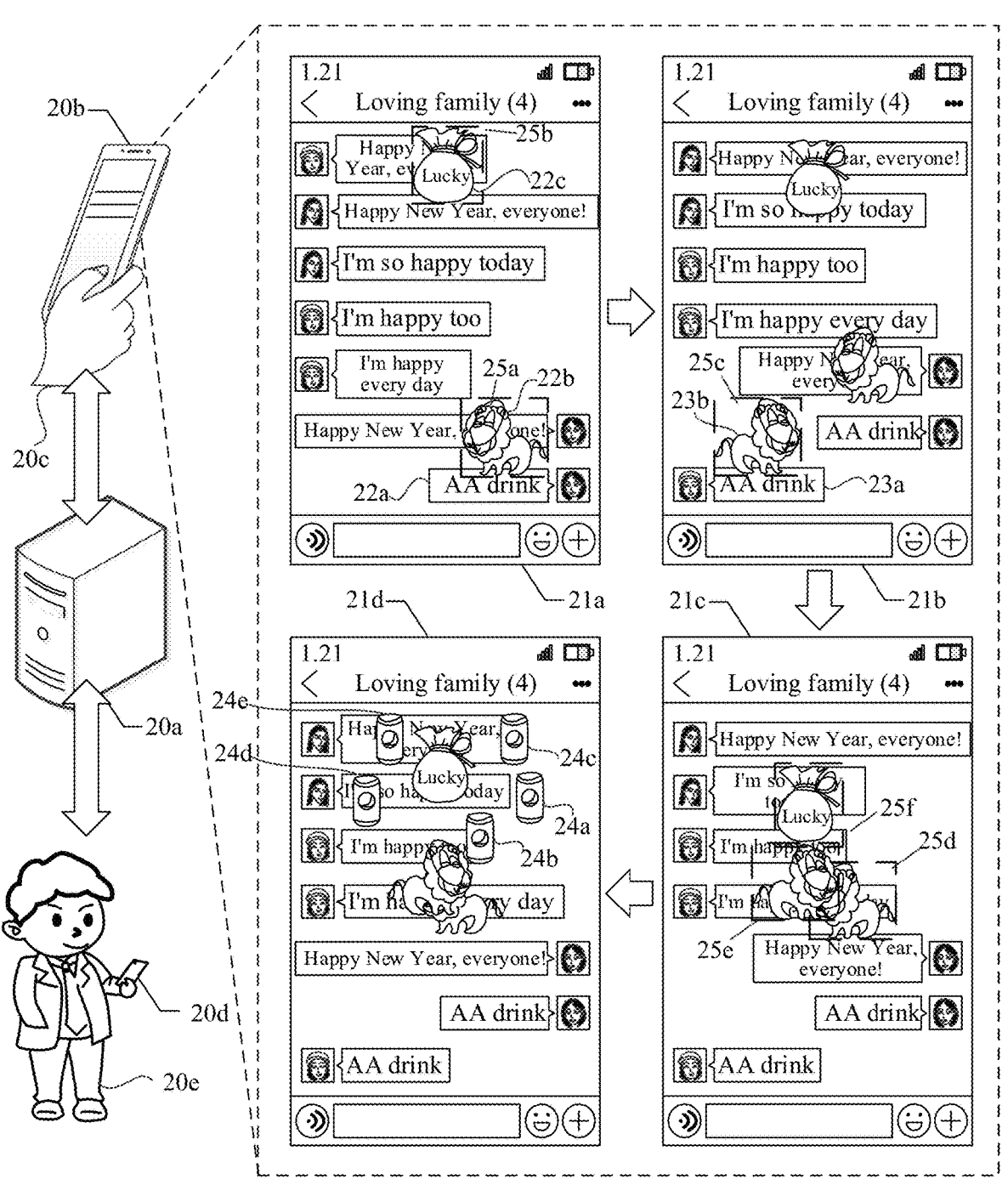
FIG. 2A is a schematic diagram showing a data exchange scenario according to an embodiment of this application.
Figure 2B:
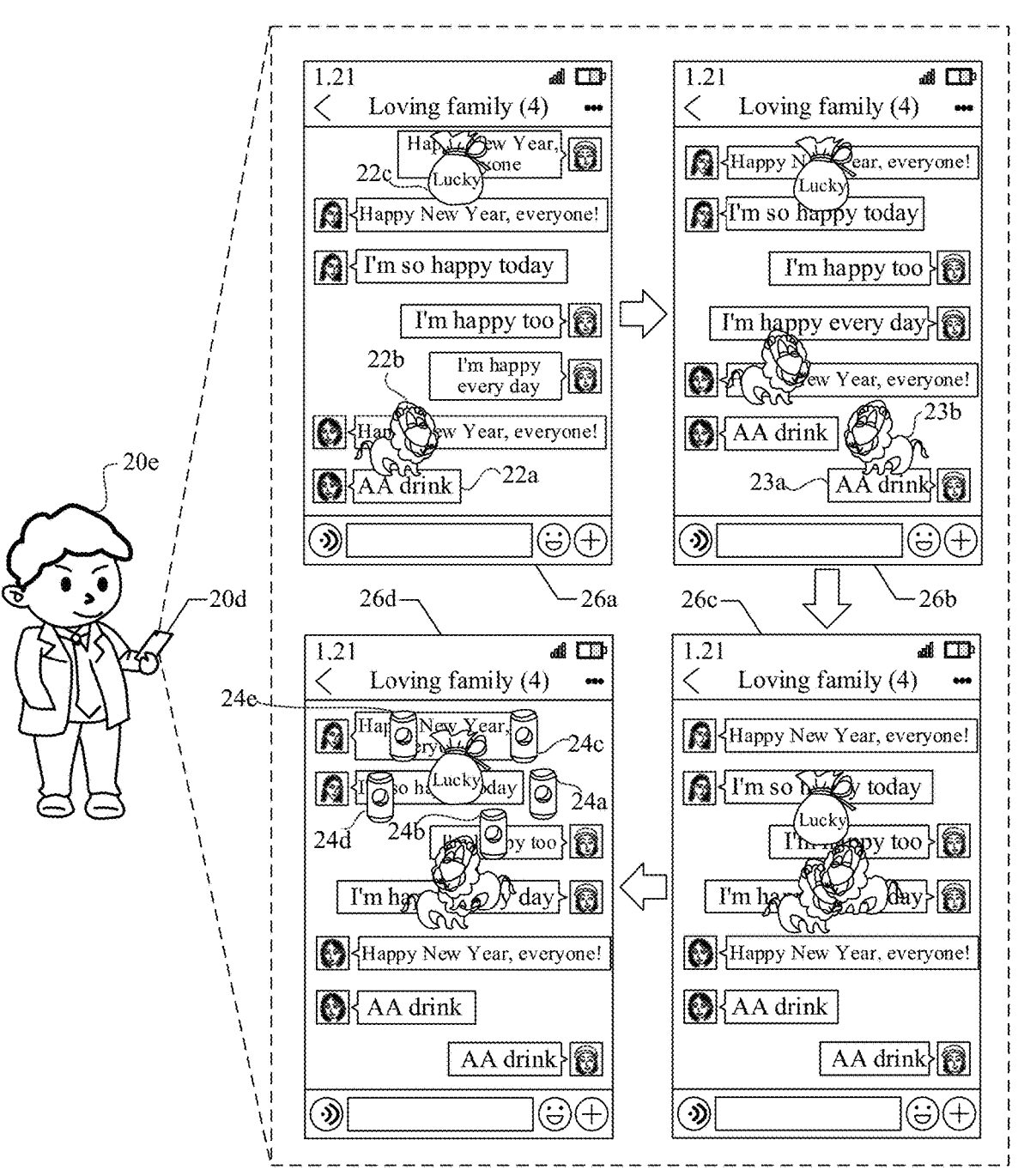
FIG. 2B is a schematic diagram showing a data exchange scenario according to an embodiment of this application.

For ease of understanding, further, refer to FIG. 2A and FIG. 2B. FIG. 2A and FIG. 2B are schematic diagrams showing a data exchange scenario according to an embodiment of this application. A server 20a shown in FIG. 2A may be the service server 2000 in the embodiment corresponding to FIG. 1. A terminal device 20b shown in FIG. 2A may be any terminal device in the terminal device cluster in the embodiment corresponding to FIG. 1. A terminal device 20d shown in FIG. 2A and FIG. 2B may be any terminal device in the terminal device cluster in the embodiment corresponding to FIG. 1. For ease of understanding, in this embodiment of this application, an example in which the terminal device 20b is a first terminal and the terminal device 20d is a second terminal is used for describing a specific process of data exchange between the terminal device 20b, the terminal device 20d, and the server 20a shown in FIG. 2A and FIG. 2B.

An object corresponding to the terminal device 20b may be an object 20c, and the object 20c may serve as a message sender or a message recipient through a first client on the terminal device 20b. An object corresponding to the terminal device 20d may be an object 20e, and the object 20e may serve as a message sender or a message recipient through a second client on the terminal device 20d. The first client and the second client may periodically obtain a resource library associated with interactive emoticon rain from the server 20a.

An interaction interface 21a, an interaction interface 21b, an interaction interface 21c, and an interaction interface 21d shown in FIG. 2A may be interaction interfaces of the first client at different moments. The object 20c may transmit an interaction message 22a through the first client. In this way, the first client may obtain the interaction interface 21a on which the interaction message 22a is displayed. When the interaction message 22a is displayed on the interaction interface 21a, the first client may obtain a virtual object 22b associated with the interaction message 22a from the resource library, display the obtained virtual object 22b in an interaction area in which the interaction message 22a is located, and then move and display, on the interaction interface 21a, the virtual object 22b from a location of the interaction area in which the interaction message 22a is located. The interaction area in which the interaction message 22a is located may be a message box of the interaction message 22a on the interaction interface 21a. In this case, a display location of the virtual object 22b may be a display location 25a. The virtual object 22b may be a "lion" shown in FIG. 2A. A style of the virtual object 22b is not limited in this application.

In addition, when the virtual object 22b is displayed on the interaction interface 21a, the first client may obtain a resource object 22c associated with the interaction message 22a from the resource library, display the obtained resource object 22c at a target location on the interaction interface 21a, and then move and display, on the interaction interface 21a, the resource object 22c from the target location. The target location may be the top of a message area on the interaction interface 21a. In this case, a display location of the resource object 22c may be a display location 25b. The resource object 22c may be a "lucky bag" shown in FIG. 2A. A style of the resource object 22c is not limited in this application.

As shown in FIG. 2A, the object 20c may receive an interaction message 23a through the first client. In this way, the first client may obtain the interaction interface 21b on which the interaction message 23a is displayed. When the interaction message 23a is displayed on the interaction interface 21b, the first client may obtain a virtual object 23b associated with the interaction message 23a from the resource library, display the obtained virtual object 23b in an interaction area in which the interaction message 23a is located, and then move and display, on the interaction interface 21b, the virtual object 23b from a location of the interaction area in which the interaction message 23a is located. The interaction area in which the interaction message 23a is located may be a message box of the interaction message 23a on the interaction interface 21b. In this case, a display location of the virtual object 23b may be a display location 25c. The virtual object 23b may be the "lion" shown in FIG. 2A. A style of the virtual object 23b is not limited in this application.

As shown in FIG. 2A, during joint movement of the virtual object 22b, the virtual object 23b, and the resource object 22c, display locations respectively corresponding to the virtual object 22b, the virtual object 23b, and the resource object 22c change. Herein, it is assumed that a display location of the virtual object 23b in movement may coincide with a display location of the resource object 22c in movement. In this case, when the display location of the virtual object 23b in movement coincides with the display location of the resource object 22c in movement, the first client may trigger the virtual object 23b to perform an interactive action (for example, a collision action) with respect to the resource object 22c, to shift a location of the resource object 22c on the interaction interface 21c, and switch the interaction interface 21c to the interaction interface 21d. When the display location of the virtual object 23b in movement coincides with that the display location of the resource object 22c in movement, the display location of the resource object 22c may be a display location 25f, the display location of the virtual object 23b may be a display location 25e, and the display location of the virtual object 22b may be a display location 25d.

In addition, the first client may display, at the display location 25*f* of the resource object 22*c*, a resource sub-object matching the interaction message 23*a*. Herein, there may be at least one resource sub-object matching the interaction message 23*a*. For example, as shown in FIG. 2A, there may be five resource sub-objects matching the interaction message 23*a*. The five resource sub-objects may include a resource sub-object 24*a*, a resource sub-object 24*b*, a resource sub-object 24*c*, a resource sub-object 24*d*, and a resource sub-object 24*e*.

Optionally, when the display location of the virtual object 22*b* in movement coincides with the display location of the resource object 22*c* in movement, the first client may trigger the virtual object 22*b* to perform an interactive action (for example, a collision action) with respect to the resource object 22*c*, to shift a location of the resource object 22*c* on the interaction interface 21*c*. In addition, the first client may display, at the display location 25*f* of the resource object 22*c*, a resource sub-object (not shown in the figure) matching the interaction message 22*a*. Herein, there may be at least one resource sub-object matching the interaction message 22*a*.

It can be understood that different "lions" jump on the interaction interface after bursting out of different message bubbles. When a track of a "lion" meets a falling track of the "lucky bag," the "lion" pushes up the "lucky bag," and materials of various elements (namely, resource sub-objects) fall out of the "lucky bag." When the display location of the resource object 22*c* in movement coincides with the display location of the virtual object 22*b* and the display location of the virtual object 23*b* at different moments, two "lions" may interact with each other and push up the "lucky bag" in turn.

It is to be understood that the resource sub-object matching the interaction message 23*a* may be referred to as a first resource sub-object, and the resource sub-object matching the interaction message 22*a* may be referred to as a second resource sub-object. In this embodiment of this application, an example in which there are at least two first resource sub-objects and at least two second resource sub-object is used for description. The first resource sub-object and the second resource sub-object may be the same or different. This is not limited in this embodiment of this application.

An interaction interface 26*a*, an interaction interface 26*b*, an interaction interface 26*c*, and an interaction interface 26*d* shown in FIG. 2B may be interaction interfaces of the second client at different moments. The object 20*e* may receive an interaction message 22*a* through the second client. In this way, the second client may obtain the interaction interface 26*a* on which the interaction message 22*a* is displayed. When the interaction message 22*a* is displayed on the interaction interface 26*a*, the second client may display, in an interaction area in which the interaction message 22*a* is located, a virtual object 22*b* associated with the interaction message 22*a*, and then move and display, on the interaction interface 26*a*, the virtual object 22*b* from a location of the interaction area in which the interaction message 22*a* is located.

In addition, when the virtual object 22*b* is displayed on the interaction interface 26*a*, the second client may display, at a target location on the interaction interface 26*a*, a resource object 22*c* associated with the interaction message 22*a*, and then move and display, on the interaction interface 26*a*, the resource object 22*c* from the target location.

As shown in FIG. 2B, the object 20*e* may transmit an interaction message 23*a* through the second client. In this way, the second client may obtain the interaction interface 26*b* on which the interaction message 23*a* is displayed. When the interaction message 23*a* is displayed on the interaction interface 26*b*, the second client may display, in an interaction area in which the interaction message 23*a* is located, a virtual object 23*b* associated with the interaction message 23*a*, and then move and display, on the interaction interface 26*b*, the virtual object 23*b* from a location of the interaction area in which the interaction message 23*a* is located.

As shown in FIG. 2B, during joint movement of the virtual object 22*b*, the virtual object 23*b*, and the resource object 22*c*, display locations respectively corresponding to the virtual object 22*b*, the virtual object 23*b*, and the resource object 22*c* change. Herein, it is assumed that a display location of the virtual object 23*b* in movement may coincide with a display location of the resource object 22*c* in movement. In this case, when the display location of the virtual object 23*b* in movement coincides with the display location of the resource object 22*c* in movement, the second client may trigger the virtual object 23*b* to perform an interactive action (for example, a collision action) with respect to the resource object 22*c*, to shift a location of the resource object 22*c* on the interaction interface 26*c*, and switch the interaction interface 26*c* to the interaction interface 26*d*.

In addition, the second client may display, at the display location of the resource object 22*c*, a resource sub-object 24*a*, a resource sub-object 24*b*, a resource sub-object 24*c*, a resource sub-object 24*d*, and a resource sub-object 24*e* that match the interaction message 23*a*.

Optionally, when the display location of the virtual object 22*b* in movement coincides with the display location of the resource object 22*c* in movement, the second client may trigger the virtual object 22*b* to perform an interactive action (for example, a collision action) with respect to the resource object 22*c*, to shift a location of the resource object 22*c* on the interaction interface 26*c*. In addition, the second client may display, at the display location of the resource object 22*c*, a resource sub-object matching the interaction message 22*a*.

It can be learned that, in this embodiment of this application, an effective interaction technical solution can be implemented. The first virtual object is moved and displayed from the interaction area associated with the first object, and the second virtual object is displayed from the interaction area associated with the second object, so that a personalized virtual object display mode can be implemented. In addition, the first virtual object and the resource object associated with the first object, and the second virtual object associated with the second object may be displayed on the interaction interface in a superposed manner, and the first virtual object, the second virtual object, and the resource object can interact with each other on the interaction interface. Therefore, through multi-message linkage and cool visual display, this embodiment of this application can help objects better interact with each other by using emoticons (that is, virtual objects and resource objects), enrich display effects of virtual objects associated with interaction messages, and further enhance emotional expressions and fun of interaction, so as to improve user experience of interaction.

Further, FIG. 3 is a schematic flowchart of a data processing method according to an embodiment of this application. The method may be performed by a server, an application client, or both a server and an application client. The server may be the server 20*a* in the embodiment corresponding to FIG. 2A. The application client may be the first client on the terminal device 20*b* in the embodiment corresponding to FIG. 2A. For ease of understanding, an example in which the method is performed by the application client is used for description in this embodiment of this application. The data processing method may include the following S101 and S102.

S101: In a case that a first interaction message is displayed on an interaction interface, display a first virtual object in a first interaction area in which the first interaction message is located.

Specifically, in a case that the first interaction message is displayed on the interaction interface and the first interaction message includes key message data with a virtual object trigger function, the application client may obtain the first virtual object indicated by the key message data and a validity time range from a resource library. The resource library (namely, a local word list) is periodically obtained by an application client to which the interaction interface belongs. The first interaction message is transmitted by a first object. The first virtual object is associated with the first interaction message. Further, in a case that current time is within the validity time range, the application client may display the first virtual object in the first interaction area in which the first interaction message is located. Optionally, in a case that current time is not within the validity time range, the application client does not need to display the first virtual object in the first interaction area in which the first interaction message is located.

It can be understood that related data, such as user interaction information, a name of a multi-user chat interface of a user, and a friend relationship between users, is involved in this application. When the foregoing embodiments of this application are applied to a specific product or technology, user permission or consent is required, and collection, use, and processing of related data need to comply with related laws, regulations, and national standards in related countries.

It can be understood that the first object may perform user authorization in an informed case. After user authorization succeeds, the application client may perform matching between an interaction message and the key message data. In addition, the application client or the server only performs matching between the interaction message and the key message data, without analyzing or storing data of the interaction message. The application client may further display, to the first object in advance, the key message data for triggering interactive emoticon rain, so that the first object can transmit an interaction message including the key message data on the interaction interface when the first object needs to use an interactive emoticon rain function.

Optionally, in a case that the application client does not obtain a validity time range indicated by the key message data from the resource library, the application client may determine that the key message data does not have a validity time range, and determine that the key message data can take effect for a long term.

It can be understood that the application client may compare the current time with the validity time range to determine whether the current time is within the validity time range. For example, the validity time range may be January 1 to January 7. In a case that the current time is 12:00 on January 5, the application client may determine that the current time is within the validity time range. In a case that the current time is 12:00 on January 8, the application client may determine that the current time is not within the validity time range.

It can be understood that the first interaction message may be a text message, a picture message, a video message, an audio message, or an emoticon message. Examples are not listed one by one herein. For example, in a case that the first interaction message is a text message, the key message data may be a keyword extracted from the text message. For another example, in a case that the first interaction message is a picture message, the key message data may be a keyword extracted from the picture message. For another example, in a case that the first interaction message is a video message, the key message data may be a keyword identified from the video message. For another example, in a case that the first interaction message is an audio message, the key message data may be a keyword identified from the audio message. For another example, in a case that the first interaction message is an emoticon message, the key message data may be one or more pieces of emoticon data in the first interaction message.

It is to be understood that different virtual objects may be obtained based on the validity time range indicated by the key message data, thereby displaying different display effects on the interaction interface, and enhancing fun of interaction on the interaction interface. For example, at a moment T1, the first virtual object indicated by the key message data may be a virtual object D1; and at a moment T2, the first virtual object indicated by the key message data may be a virtual object D2.

It can be understood that, in a case that the first interaction message includes one piece of key message data with a virtual object trigger function, the application client may display, on the interaction interface, a first virtual object indicated by the key message data. One piece of key message data may correspond to one or more virtual objects, and a plurality of pieces of key message data may also correspond to one virtual object. Optionally, in a case that the first interaction message includes at least two pieces of key message data with a virtual object trigger function, the application client may display, on the interaction interface, a first virtual object indicated by each of the at least two pieces of key message data; or may display, on the interaction interface, a first virtual object indicated by any one of the at least two pieces of key message data. For ease of understanding, an example in which the first interaction message includes one piece of key message data is used for description in this embodiment of this application.

It can be understood that the application client may periodically obtain the resource library from the server, so that the application client can automatically apply the resource library to an object without an update. For example, when the first object starts the application client, the application client may obtain an updated resource library from the server, and use the updated resource library to update a resource library in a local memory. Key message data, a design resource, a validity time range, and a resource trajectory may be preconfigured in the resource library. The key message data herein may be a keyword or emoticon data. The design resource herein may be a first virtual resource. The resource trajectory herein may be used for indicating a moving track of the design resource on the interaction interface.

S102: Display, on the interaction interface, interactive movement involving the first virtual object and a resource object.

The interactive movement includes moving the first virtual object from a location of the first interaction area.

The application client may obtain a resource trajectory indicated by the first virtual object from the resource library, and then move and display the first virtual object based on the resource trajectory.

Figure 4:
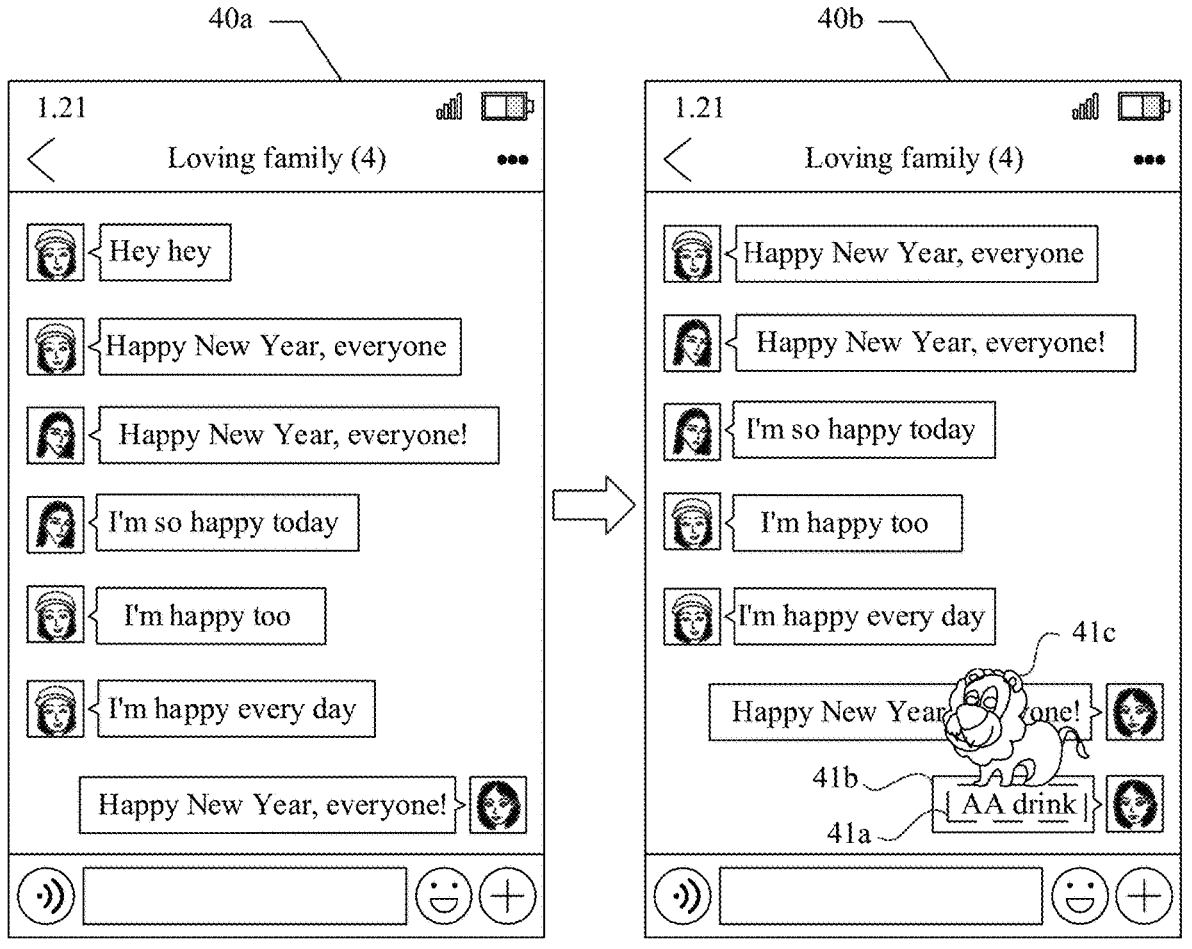
FIG. 4 is a schematic diagram showing a scenario of displaying a first virtual object according to an embodiment of this application.

For ease of understanding, refer to FIG. 4. FIG. 4 is a schematic diagram showing a scenario of displaying a first virtual object according to an embodiment of this application. An interaction interface 40a and an interaction interface 40b shown in FIG. 4 may be interaction interfaces of the application client at different moments. It is to be understood that an interaction interface for interaction on the application client may be a single-user chat interface or a multi-user chat interface. This is not limited in this application. For ease of understanding, an example in which the interaction interface is a multi-user chat interface is used for description in this embodiment of this application. A name of the multi-user chat interface herein may be "Loving family."

As shown in FIG. 4, the interaction interface 40a may include a plurality of interaction messages, and the first object may transmit a first interaction message through the application client. The first interaction message herein may be an interaction message 41a, and the interaction message 41a herein may be "AA drink." This is not limited in this application. It can be understood that, in a case that the interaction message 41a is displayed on interaction interface 40a, the application client may obtain a first interaction area in which the interaction message 41a is located, where the first interaction area herein may be an interaction area 41b; and then display a first virtual object associated with the interaction message 41a in the interaction area 41b to obtain the interaction interface 40b. The first virtual object herein may be a virtual object 41c.

It is to be understood that the virtual object 41c herein may be a "lion" or a "tiger." This is not limited in this application. The interaction area 41b is a message bubble on the interaction interface 40b. Visually, display of the "lion" in the interaction area 41b may be understood as that the "lion" jumps out of the message bubble.

It can be understood that the first virtual object is not completely displayed in the first interaction area, and the first virtual object may be partially displayed in the first interaction area. Visually, the first virtual object may jump out of the first interaction area and then continue to move and be displayed on the interaction interface.

It can be learned that, in this embodiment of this application, in a case that the first interaction message is displayed on the interaction interface, the first virtual object may be displayed in the first interaction area in which the first interaction message is located, and then the interactive movement involving the first virtual object and the resource object is displayed on the interaction interface. The interactive movement includes moving and displaying the first virtual object from the location of the first interaction area. The first interaction message is transmitted by the first object, and the first virtual object is associated with the first interaction message. It can be learned that, when the first object transmits the first interaction message on the interaction interface, the first virtual object associated with the first interaction message may be displayed in the first interaction area in which the first interaction message is located. In addition, because a display location of the first virtual object is related to an area in which the first interaction message is located, associated virtual objects can be displayed at different locations for interaction messages in different areas on the interaction interface, so that virtual objects and resource objects associated with same interaction messages can be displayed by using different presentation animations on the interaction interface. Therefore, a personalized virtual object display mode is implemented, and display effects of virtual objects associated with interaction messages are enriched.

Further, FIG. 5 is a schematic flowchart of a data processing method according to an embodiment of this application. The method may be performed by a server, an application client, or both a server and an application client. The server may be the server 20a in the embodiment corresponding to FIG. 2A. The application client may be the first client on the terminal device 20b in the embodiment corresponding to FIG. 2A. For ease of understanding, an example in which the method is performed by the application client is used for description in this embodiment of this application. The data processing method may include the following S201 to S204.

S201: In a case that a first interaction message is displayed on an interaction interface, display a first virtual object in a first interaction area in which the first interaction message is located.

The first interaction message is transmitted by a first object. The first virtual object is associated with the first interaction message.

For a specific process of displaying, by the application client, the first virtual object in the first interaction area, refer to the descriptions of S101 in the embodiment corresponding to FIG. 3. Details are not described herein again.

S202: In a case that the first virtual object is displayed in the first interaction area, display a resource object at a target location on the interaction interface.

The resource object is associated with the first interaction message.

It can be understood that the target location may be different from or the same as a location of the first interaction area on the interaction interface. In this embodiment of this application, an example in which the target location is different from the location of the first interaction area on the interaction interface is used for description.

It can be understood that, in a case that the first interaction message is displayed on the interaction interface, the application client may simultaneously display the first virtual object and resource object on the interaction interface, or may first display the first virtual object and then display the resource object, or may first display the resource object and then display the first virtual object. For ease of understanding, an example in which the first virtual object is first displayed and then the resource object is displayed is used for description in this embodiment of this application. A display time interval between the first virtual object and the resource object is not limited in this embodiment of this application.

Figure 6:
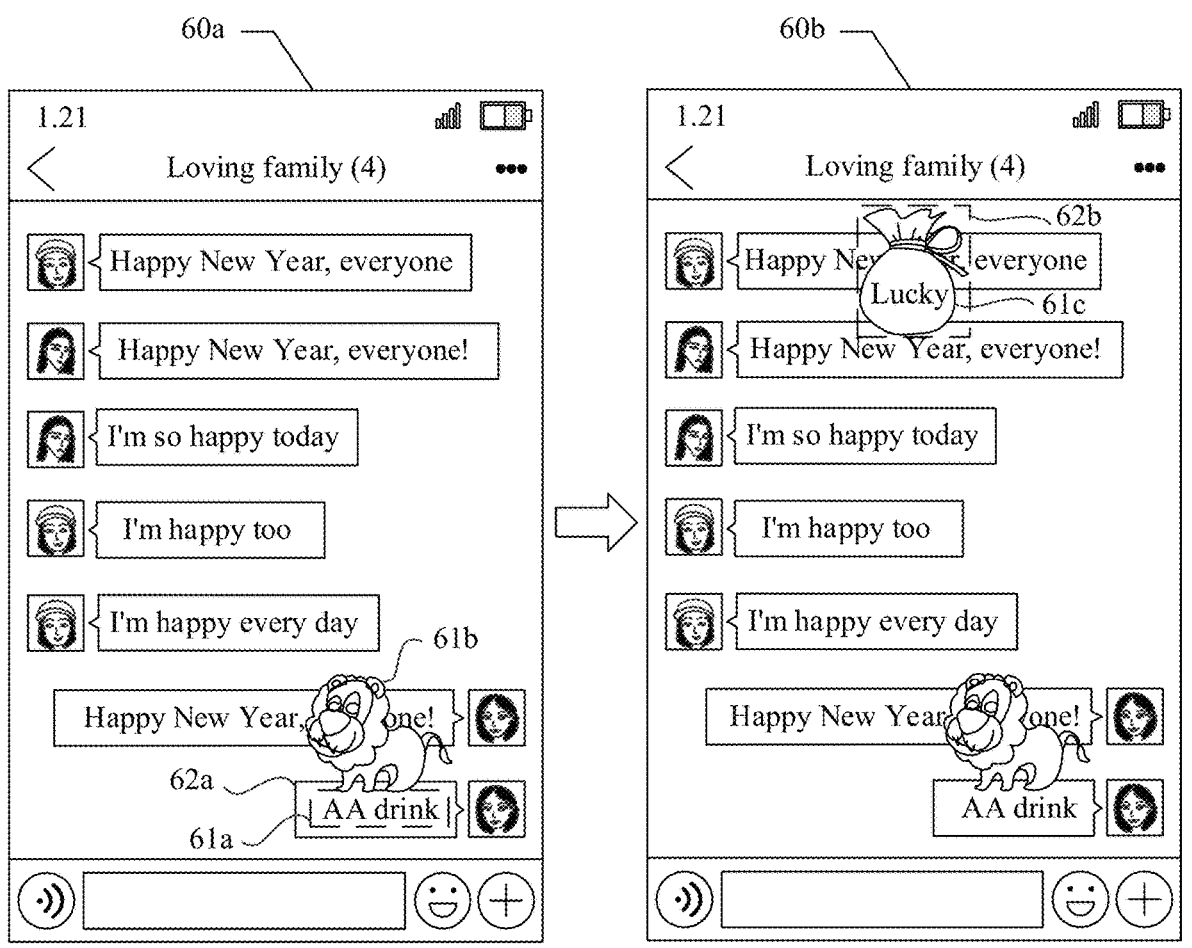
FIG. 6 is a schematic diagram showing a scenario of displaying a resource object according to an embodiment of this application.

For ease of understanding, refer to FIG. 6. FIG. 6 is a schematic diagram showing a scenario of displaying a resource object according to an embodiment of this application. An interaction interface 60a and an interaction interface 60b shown in FIG. 6 may be interaction interfaces of the application client at different moments. The interaction interface 60a may be the interaction interface 40b in the embodiment corresponding to FIG. 4. An interaction message 61a and a virtual object 61b associated with the interaction message 61a may be displayed on the interaction interface 60a.

As shown in FIG. 6, in a case that the virtual object 61b is displayed on the interaction interface 60a, after a specific display time interval, the application client may determine a target location on the interaction interface 60a, and then display, at the target location, a resource object 61c associated with the interaction message 61a, to switch the interaction interface 60a to the interaction interface 60b. The virtual object 61b may be displayed in an interaction area 62a, and the resource object 61c may be displayed at the target location 62b. For example, in a case that the display time interval is 1 second, the application client may display the virtual object 61*b* in the interaction area 62*a*, and then display the resource object 61*c* at the target location 62*b* after 1 second.

S203: Display, on the interaction interface, interactive movement involving the first virtual object and the resource object.

The interactive movement includes moving and displaying the first virtual object from a location of the first interaction area.

Specifically, the application client may obtain an object location distance between a display location of the first virtual object and a display location of the resource object. Further, the application client may generate, on the interaction interface, a virtual area indicated by the object location distance. Further, the application client may move and display the first virtual object based on the virtual area from a location of the first interaction area.

It can be understood that a resource trajectory indicated by the first virtual object is determined based on the display location of the first virtual object and the display location of the resource object. For a specific process of starting, by the application client, to move and display the first virtual object based on the resource trajectory, refer to descriptions of S2031 to S2035 in an embodiment corresponding to FIG. 10 below.

S204: Move and display, on the interaction interface, the resource object from the target location.

Specifically, the application client may obtain a default moving track indicated by the resource object from a resource library. Neither the default moving track nor a moving speed of the resource object is limited in this embodiment of this application. Further, the application client may move and display, on a session interface, the resource object based on the default moving track from the target location. The default moving track herein may also be referred to as a resource trajectory indicated by the resource object. In a case that different input boxes are displayed on the interaction interface, resource objects have a same floating range. For example, in a case that a system keyboard and an object bar are displayed, resource objects have a same moving range, but have different display effects.

It can be understood that the application client may simultaneously move and display the first virtual object and the resource object on the interaction interface, or may first move and display the first virtual object on the interaction interface and then move and display the resource object, or may first move and display the resource object on the interaction interface and then move and display the first virtual object. In a case that the target location is different from the location of the first interaction area on the interaction interface, the first virtual object in movement and display and the resource object in movement and display may perform an interactive action. Optionally, in a case that the target location is the same as the location of the first interaction area on the interaction interface, the resource trajectory indicated by the first virtual object is different from the resource trajectory indicated by the resource object, and the first virtual object in movement and display and the resource object in movement and display may also perform an interactive action.

Figure 7A:
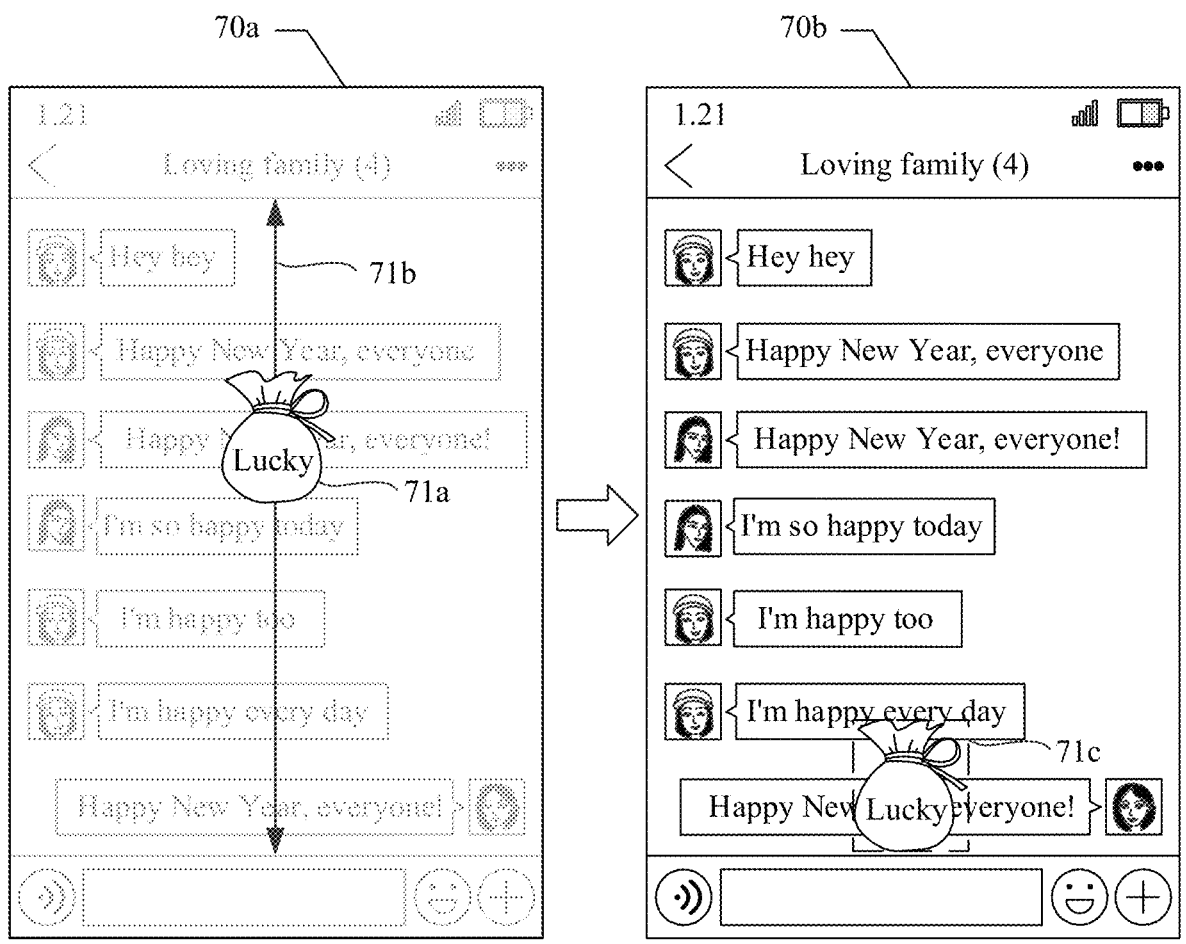
FIG. 7A is a schematic diagram showing a scenario of moving a resource object according to an embodiment of this application.

It is to be understood that, for a specific process of directly moving and displaying, by the application client, the resource object on the session interface, reference may be made to FIG. 7A. FIG. 7A is a schematic diagram showing a scenario of moving a resource object according to an embodiment of this application. An interaction interface 70*a* may include a resource object 71*a*. A default moving track of the resource object 71*a* on the interaction interface 70*a* may be a resource trajectory 71*b*. A starting point of the resource trajectory 71*b* may be a target location on the interaction interface 70*a*, and an ending point of the resource trajectory 71*b* may be an update location on the interaction interface 70*a*. Specific locations of the target location and the update location are not limited in this embodiment of this application.

An interaction interface 70*b* shown in FIG. 7A may indicate that the resource object 71*a* moves from the starting point of the resource trajectory 71*b* to the ending point of the resource trajectory 71*b*. The interaction interface may switch from the interaction interface 70*a* to the interaction interface 70*b*. The resource object 71*a* may move from the target location on the interaction interface 70*a* to the update location on the interaction interface 70*b*. In this case, a display location of the resource object 71*a* may be a display location 71*c*.

Optionally, the interaction interface may include a virtual object area (namely, an object bar) and a message display area. The message display area is an area other than the virtual object area on the interaction interface. It is to be understood that the application client may move the resource object from the target location. Further, in a case that the resource object in movement is located in the message display area, the application client may display the resource object in the message display area; or in a case that the resource object in movement is located in the virtual object area, the application client may display the resource object in the virtual object area.

Figure 7B:
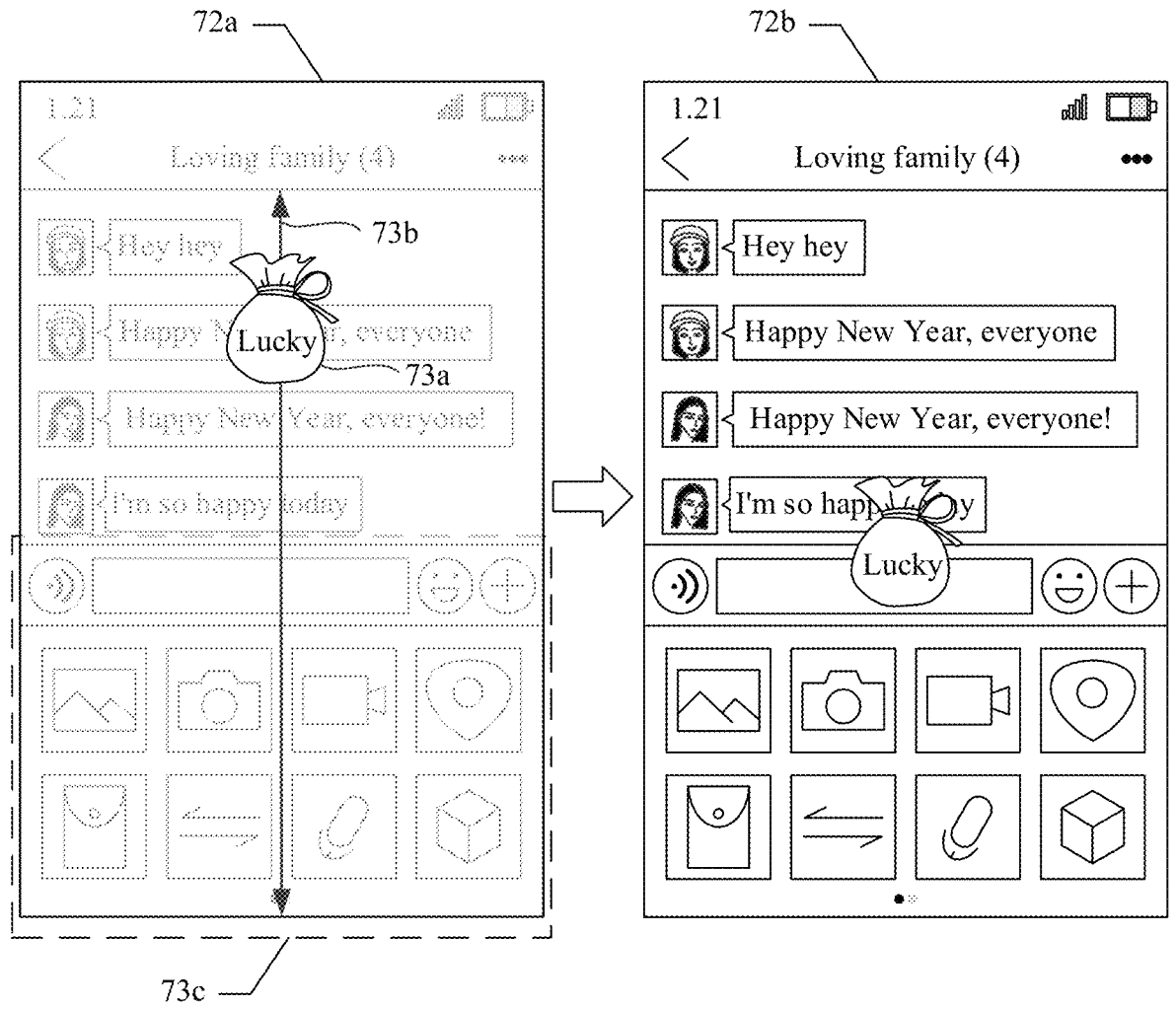
FIG. 7B is a schematic diagram showing a scenario of moving a resource object according to an embodiment of this application.

It is to be understood that, for a specific process of moving and displaying, by the application client, the resource object in the virtual object area and the message display area, reference may be made to FIG. 7B. FIG. 7B is a schematic diagram showing a scenario of moving a resource object according to an embodiment of this application. An interaction interface 72*a* may include a resource object 73*a*. A default moving track of the resource object 73*a* on the interaction interface 72*a* may be a resource trajectory 73*b*.

As shown in FIG. 7B, the interaction interface 72*a* may include a virtual object area 73*c* and a message display area, and the message display area may be an area other than the virtual object area 73*c* on the interaction interface 72*a*. It can be understood that the interaction interface 72*a* shown in FIG. 7B may indicate that the resource object 73*a* moves from a starting point of the resource trajectory 73*b* to an ending point of the resource trajectory 73*b*. During movement and display of the resource object 73*a*, the interaction interface may switch from the interaction interface 72*a* to an interaction interface 72*b*.

As shown in the interaction interface 72*b* in FIG. 7B, in a case that the resource object 73*a* in movement is located in the message display area, the application client may display the resource object 73*a* in movement in the message display area; or in a case that the resource object 73*a* in movement is located in the virtual object area 73*c*, the application client may display the resource object 73*a* in the virtual object area 73*c*. In a case that the resource object 73*a* in movement is located in both the virtual object area 73*c* and the message display area, the application client may display and move the resource object 73*a* in both the virtual object area 73*c* and the message display area.

Optionally, the interaction interface includes a virtual keyboard area (namely, a system keyboard) and a message display area. The message display area is an area other than the virtual keyboard area on the interaction interface. It is to be understood that the application client may move the resource object from the target location. Further, in a case that the resource object in movement is located in the message display area, the application client may display the resource object in the message display area; or in a case that the resource object in movement is located in the virtual keyboard area, the application client may display the resource object under a virtual keyboard in the virtual keyboard area.

Figure 7C:
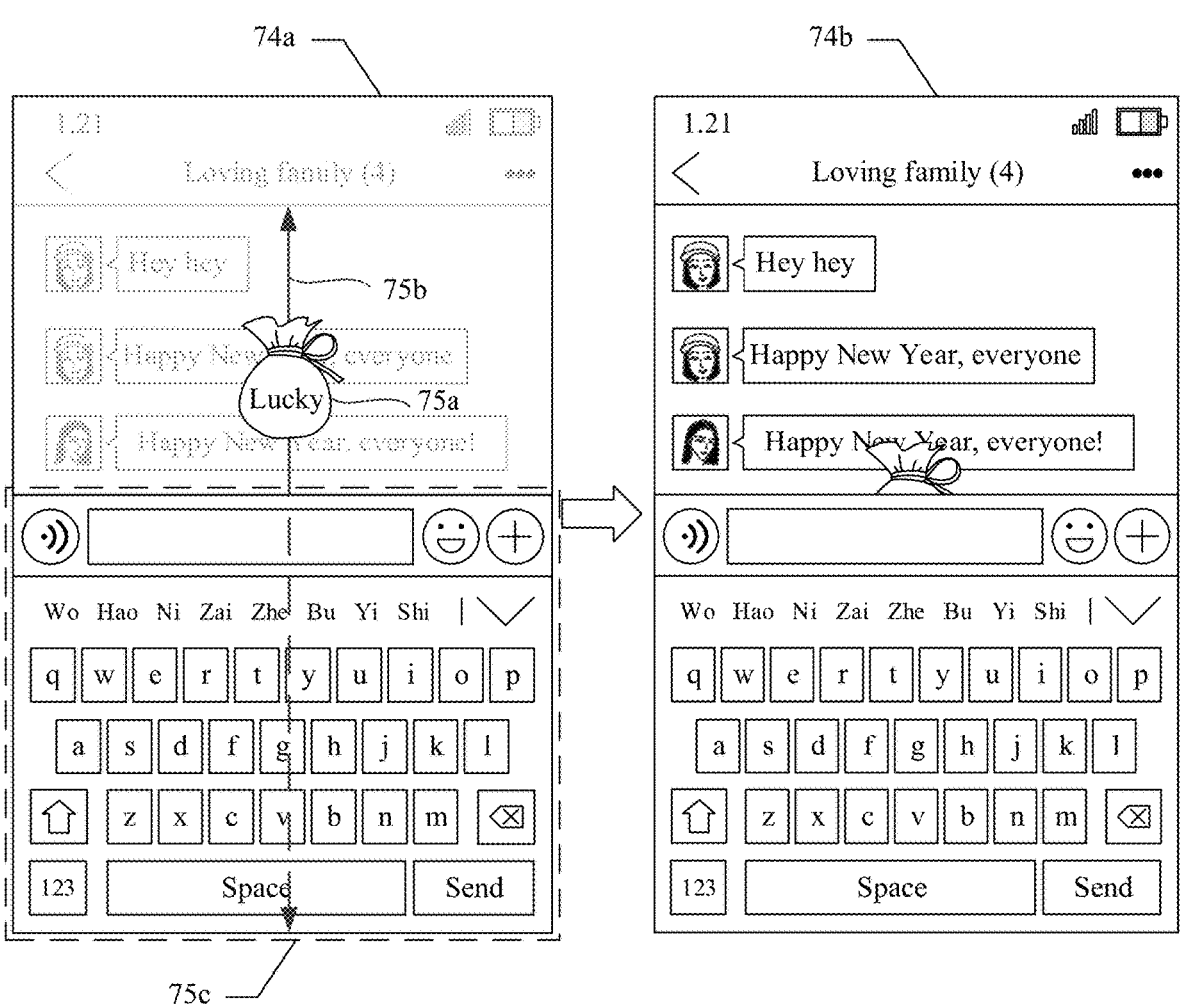
FIG. 7C is a schematic diagram showing a scenario of moving a resource object according to an embodiment of this application.

It is to be understood that, for a specific process of moving and displaying, by the application client, the resource object in the virtual keyboard area and the message display area, reference may be made to FIG. 7C. FIG. 7C is a schematic diagram showing a scenario of moving a resource object according to an embodiment of this application. An interaction interface 74a may include a resource object 75a. A default moving track of the resource object 75a on the interaction interface 74a may be a resource trajectory 75b.

As shown in FIG. 7C, the interaction interface 74a may include a virtual keyboard area 75c and a message display area, and the message display area may be an area other than the virtual keyboard area 75c on the interaction interface 74a. It can be understood that the interaction interface 74a shown in FIG. 7C may indicate that the resource object 75a moves from a starting point of the resource trajectory 75b to an ending point of the resource trajectory 75b in the message display area. During movement and display of the resource object 75a, the interaction interface may switch from the interaction interface 74a to an interaction interface 74b. An ending point of the resource trajectory 75b on interaction interface 74a is different from the ending point of the resource trajectory 75b in the message display area. After moving to the ending point of the resource trajectory 75b in the message display area, the resource object 75a continues to move to the ending point of the resource trajectory 75b on the interaction interface 74a.

As shown in the interaction interface 74b in FIG. 7C, in a case that the resource object 75a in movement is located in the message display area, the application client may display the resource object 75a in movement in the message display area; or in a case that the resource object 75a in movement is located in the virtual keyboard area 75c, the application client may display the resource object 75a in movement under a virtual keyboard in the virtual keyboard area 75c. In a case that the resource object 75a in movement is located in both the virtual keyboard area 75c and the message display area, the application client may display, in the message display area, a part of the resource object 73a in movement that is located in the message display area; and display, under a virtual keyboard in the virtual keyboard area 75c, a part of the resource object 73a in movement that is located in the virtual keyboard area 75c.

It can be understood that, in a case that the resource object 75a is partially displayed or completely not displayed on the interaction interface 74b, and the resource object 75a does not move to the ending point of the resource trajectory 75b on the interaction interface 74a, when the first object performs a hide operation on the virtual keyboard area 75c on the interaction interface 74b, the application client may hide the virtual keyboard area 75c on the interaction interface 74b in response to the hide operation performed by the first object, so that the resource object 75a is completely displayed on the interaction interface 74b again.

It is to be understood that, during the foregoing interactive movement, the application client may control the first virtual object to perform an interactive action with respect to the resource object in a case that the display location of the first virtual object coincides with the display location of the resource object. The interactive action herein may be a collision action.

It is to be understood that the application client may add a virtual detection area (namely, a first virtual detection area) for the first virtual object, and add a resource detection area for the resource object. Further, during movement of the first virtual object and the resource object, the application client may generate an area-coincidence degree (namely, a first area-coincidence degree) between the virtual detection area and the resource detection area based on an area intersection and an area union between the virtual detection area and the resource detection area. Further, in a case that the area-coincidence degree is greater than a coincidence degree threshold, the application client may determine that the display location of the first virtual object in movement coincides with the display location of the resource object in movement. A specific value of the coincidence degree threshold is not limited in this embodiment of this application. Optionally, in a case that the area-coincidence degree is not greater than the coincidence degree threshold, the application client may determine that the display location of the first virtual object in movement does not coincide with the display location of the resource object in movement.

It can be understood that the application client may determine the area-coincidence degree between the virtual detection area and the resource detection area by using an intersection-over-union (IoU). The IoU is a concept used in object detection, and may indicate a ratio of the area intersection to the area union herein, that is, a result of the area intersection divided by the area union.

Shapes of a virtual detection area and a resource detection area used in collision detection in this embodiment of this application may be a semicircular shape. In this case, the collision detection may be referred to as semicircular collision detection. The virtual detection area may represent an upper half of the first virtual object, and the resource detection area may represent a lower half of the resource object. The collision detection may be expressed as adding boundaries (namely, detection areas) to objects that require collision detection and determining whether the boundaries meet a collision detection condition (for example, in a case that the area-coincidence degree is greater than the coincidence degree threshold, it is determined that the boundaries meet the collision detection condition), to determine a collision detection result. It is to be understood that the shapes of the virtual detection area and the resource detection area may alternatively be a rectangular or triangular shape. This is not limited in this application.

Optionally, during movement of the first virtual object and the resource object, the application client may further determine whether the virtual detection area and the resource detection area have an intersection. Further, in a case that the virtual detection area and the resource detection area have an intersection, the application client may determine that the display location of the first virtual object in movement coincides with the display location of the resource object in movement. Optionally, in a case that the virtual detection area and the resource detection area have no intersection, the application client may determine that the display location of the first virtual object in movement does not coincide with the display location of the resource object in movement.

Figure 8:
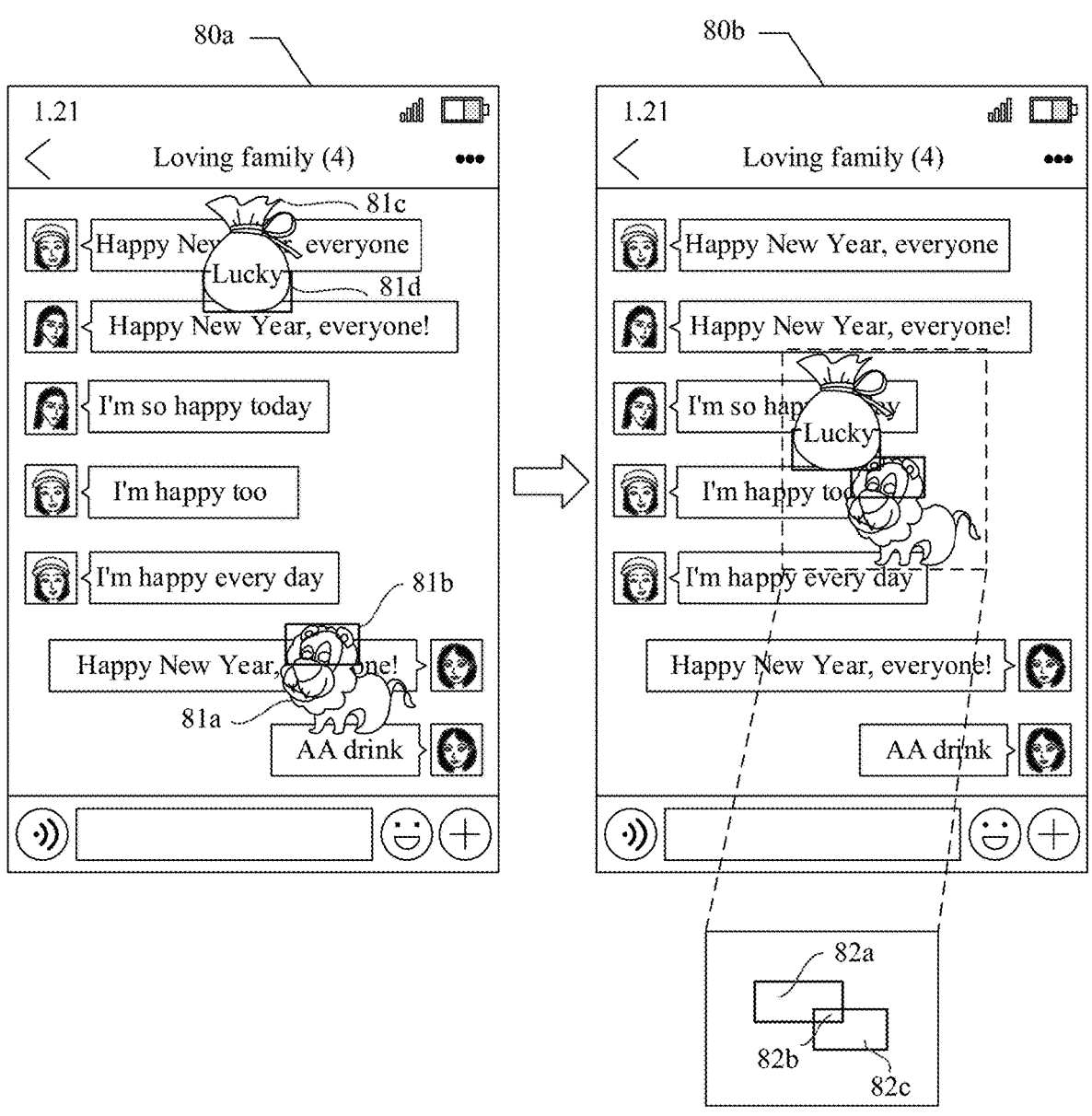
FIG. 8 is a schematic diagram showing a collision detection scenario according to an embodiment of this application.

For ease of understanding, refer to FIG. 8. FIG. 8 is a schematic diagram showing a collision detection scenario according to an embodiment of this application. An interaction interface 80a and an interaction interface 80b shown in FIG. 8 may be interaction interfaces of the application client at different moments. The interaction interface 80*a* may be the interaction interface 60*b* in the embodiment corresponding to FIG. 6.

As shown in FIG. 8, a virtual object 81*a* and a resource object 81*c* are displayed on the interaction interface 80*a*. The application client may add a virtual detection area for the virtual object 81*a*, and add a resource detection area for the resource object 81*c*. The virtual detection area herein may be a detection area 81*b*, and the resource detection area herein may be a detection area 81*d*. It can be understood that, during the movement of the virtual object 81*a* and the resource object 81*c*, a location of the detection area 81*b* moves with the virtual object 81*a*, and a location of the detection area 81*d* moves with the resource object 81*c*.

As shown in FIG. 8, during switching from the interaction interface 80*a* to the interaction interface 80*b*, an area 82*a* and an area 82*b* on the interaction interface 80*b* may be the detection area 81*d*, and the area 82*b* and an area 82*c* on the interaction interface 80*b* may be the detection area 81*b*. The area 82*b* may be an area intersection between the detection area 81*b* and the detection area 81*d*. The area 82*a*, the area 82*b*, and the area 82*c* may be an area union between the detection area 81*b* and the detection area 81*d*. In this way, the application client may generate an area-coincidence degree between the detection area 81*b* and the detection area 81*d* based on the area intersection and the area union; and in a case that the area-coincidence degree is greater than a coincidence degree threshold, may determine that a display location of the virtual object 81*a* in movement coincide with a display location of the resource object 81*c* in movement.

Optionally, during switching from the interaction interface 80*a* to the interaction interface 80*b*, in a case that the detection area 81*b* and the detection area 81*d* have an intersection, that is, the area 82*b* may be generated based on the detection area 81*b* and the detection area 81*d*, the application client may determine that the display location of the virtual object 81*a* in movement coincides with the display location of the resource object 81*c* in movement.

It is to be understood that a location of the resource objects may be shifted on the interaction interface based on an interactive action. The application client may determine a display location of the resource object whose location has been shifted. The resource object whose location has been shifted may or may not exceed a display range of the interaction interface, i.e., the resource object may move out of the display range or remain within the display range.

In a case that the resource object whose location has been shifted exceeds the display range of the interaction interface, i.e., the resource object moves out of the display range of the interaction interface, the application client may display, at a location at which the resource object disappears, a first resource sub-object matching the first interaction message. The first resource sub-object has a function of moving on the interaction interface. It is to be understood that, in a case that the resource object whose location has been shifted exceeds the display range of the interaction interface (namely, a screen range), the resource object whose location has been shifted does not return to the interaction interface again, but is automatically destructed directly. This can ensure that the display location of the first virtual object does not coincide with a display location of the resource object beyond the screen range.

Figure 9A:
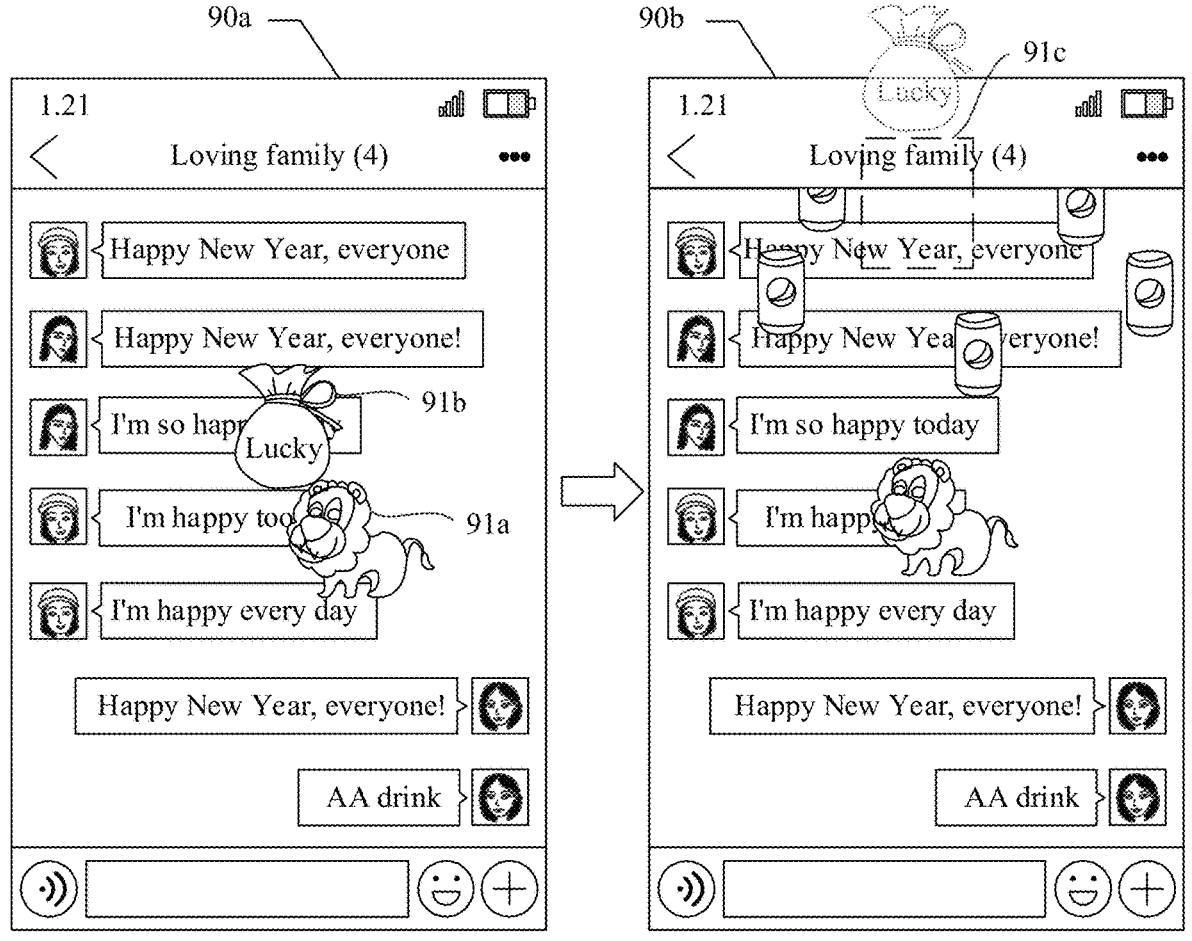
FIG. 9A is a schematic diagram showing a scenario of displaying a first resource sub-object according to an embodiment of this application.

For ease of understanding, refer to FIG. 9A. FIG. 9A is a schematic diagram showing a scenario of displaying a first resource sub-object according to an embodiment of this application. An interaction interface 90*a* and an interaction interface 90*b* shown in FIG. 9A may be interaction interfaces of the application client at different moments. The interaction interface 90*a* may be the interaction interface 80*b* in the embodiment corresponding to FIG. 8. The interaction interface 90*a* may include a virtual object 91*a* and a resource object 91*b*. The virtual object 91*a* and the resource object 91*b* may be associated with the first interaction message.

As shown in FIG. 9A, a location of the resource object 91*b* may be shifted based on an interactive action performed by the virtual object 91*a*. When the resource object 91*b* whose location has been shifted exceeds a display range of the interaction interface, the interaction interface may switch from the interaction interface 90*a* to the interaction interface 90*b*. In this case, the resource object 91*b* whose location has been shifted may exceed the display range from a disappearance location 91*c* on the interaction interface 90*b*. This can ensure that a resource sub-object triggered by the resource object beyond a screen range plays a current animation, without disappearing instantly. Therefore, the application client may display the resource sub-object matching the first interaction message at the disappearance location 91*c*. The first interaction message herein may be "AA drink." The resource sub-object herein may be "AA drink bottle" displayed from the disappearance location 91*c*.

Optionally, in a case that the resource object whose location has been shifted is within the display range of the interaction interface, the application client may display, at a display location of the resource object whose location has been shifted, a first resource sub-object matching the first interaction message. The first resource sub-object has a function of moving on the interaction interface. Further, the application client may continue to move and display, on the interaction interface, the resource object whose location has been shifted.

Figure 9B:
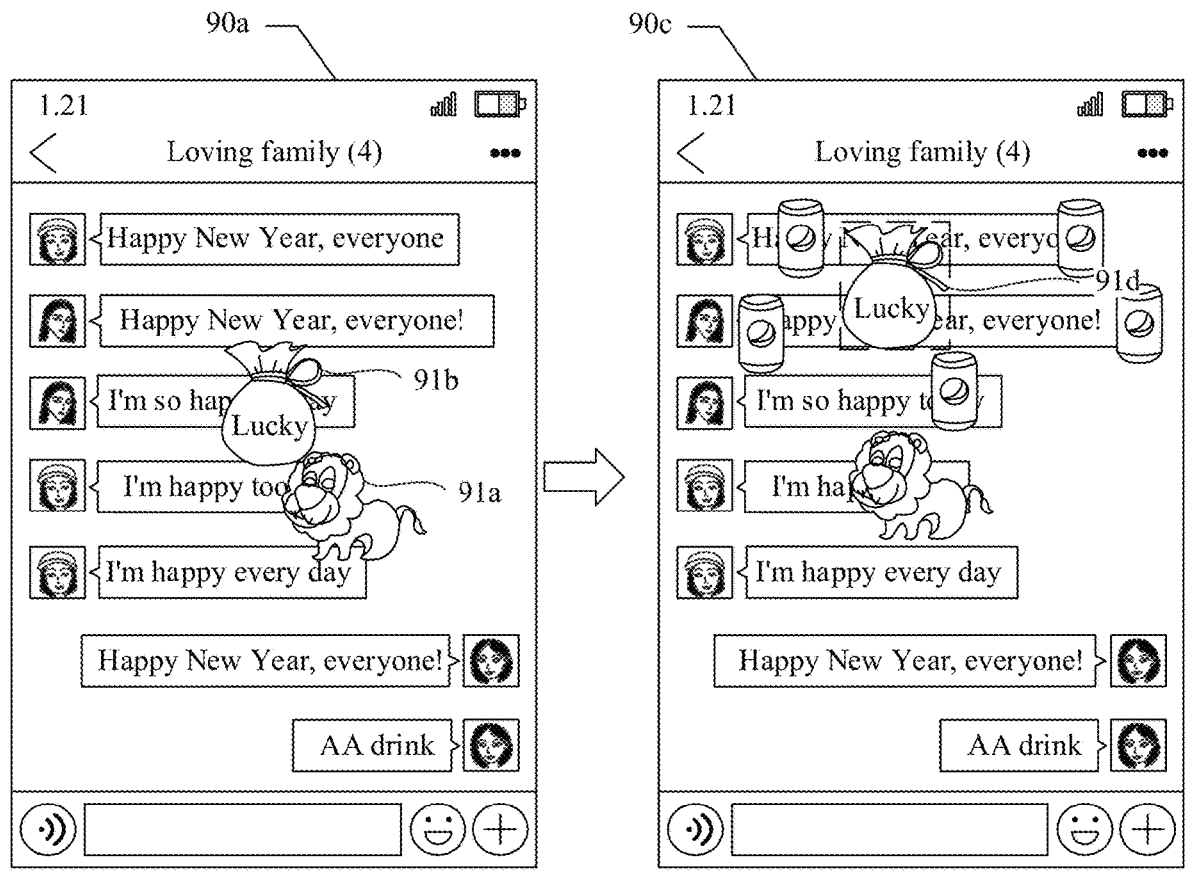
FIG. 9B is a schematic diagram showing a scenario of displaying a first resource sub-object according to an embodiment of this application.

For ease of understanding, refer to FIG. 9B. FIG. 9B is a schematic diagram showing a scenario of displaying a first resource sub-object according to an embodiment of this application. An interaction interface 90*a* and an interaction interface 90*c* shown in FIG. 9B may be interaction interfaces of the application client at different moments. The interaction interface 90*a* may be the interaction interface 90*a* in the embodiment corresponding to FIG. 9A. The interaction interface 90*a* may include a virtual object 91*a* and a resource object 91*b*. The virtual object 91*a* and the resource object 91*b* may be associated with the first interaction message.

As shown in FIG. 9B, a location of the resource object 91*b* may be shifted based on an interactive action performed by the virtual object 91*a*. When the resource object 91*b* whose location has been shifted exceeds a display range of the interaction interface, the interaction interface may switch from the interaction interface 90*a* to the interaction interface 90*c*. Therefore, the application client may display, at a display location 91*d* of the resource object 91*b* whose location has been shifted, a resource sub-object matching the first interaction message. The first interaction message herein may be "AA drink." The resource sub-object herein may be "AA drink bottle" displayed from the display location 91*d*.

It can be understood that, in a case that the resource object whose location has been shifted exceeds or does not exceed the display range of the interaction interface, the application client may alternatively move and display the first resource sub-object and continue to move and display the first virtual object on the interaction interface. A resource trajectory of the first virtual object does not change due to collision with the resource object.

It can be learned that, in this embodiment of this application, in a case that the first interaction message transmitted by the first object is displayed on the interaction interface, the first virtual object may be displayed in the first interaction area in which the first interaction message is located, and the resource object may be displayed at the target location on the interaction interface; and then the first virtual object and the resource object are moved on the interaction interface from display locations of the first virtual object and the resource object respectively. It is to be understood that, during joint movement of the first virtual object and the resource object, in a case that the display location of the first virtual object coincides with a display location of a second virtual object, the first virtual object may be triggered to perform an interactive action with respect to the resource object, so that the first resource sub-object matching the first interaction message is displayed on the interaction interface. Based on this, the first virtual object is moved and displayed from the first interaction area associated with the first object, so that a personalized virtual object display mode can be implemented. In addition, for the first virtual object and the resource object that are associated with the first interaction message, the first virtual object and the resource object can interact with each other on the interaction interface, to enrich display effects of virtual objects associated with interaction messages.

Figure 10:
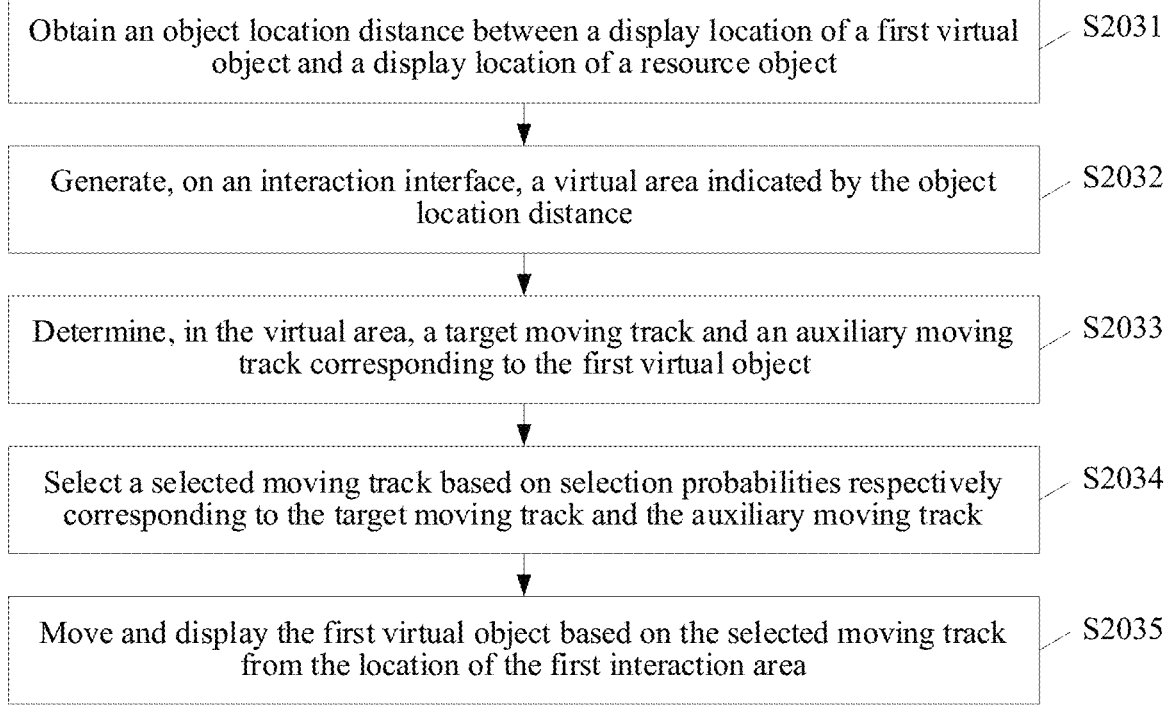
FIG. 10 is a schematic flowchart of a data processing method according to an embodiment of this application.

Further, FIG. 10 is a schematic flowchart of a data processing method according to an embodiment of this application. The data processing method may include the following S2031 to S2035, and S2031 to S2035 are a specific embodiment of S203 in the embodiment corresponding to FIG. 5.

S2031: Obtain an object location distance between a display location of a first virtual object and a display location of a resource object.

The object location distance may represent a height difference between the display location of the first virtual object and the display location of the resource object.

S2032: Generate, on an interaction interface, a virtual area indicated by the object location distance.

An application client may perform a jump action on the first virtual object in the virtual area.

S2033: Determine, in the virtual area, a target moving track and an auxiliary moving track corresponding to the first virtual object.

The target moving track is used for indicating that there is a coincident display location between a display location of the first virtual object in movement and a display location of the resource object in movement. The auxiliary moving track is different from the target moving track. The auxiliary moving track is a track other than the target moving track in the virtual area. Starting points of both the target moving track and the auxiliary moving track are a location of a first interaction area on the interaction interface.

It can be understood that the target moving track makes the display location of the first virtual object in movement inevitably coincide with the display location of the resource object in movement, and the auxiliary moving track makes the display location of the first virtual object in movement possibly coincide or not coincide with the display location of the resource object in movement.

The auxiliary moving track in the virtual area is generated through interpolation by using a blendtree of an animator (an animation production tool). This can ensure controllability of animation effects of the auxiliary moving track. The auxiliary moving track controlled by the blendtree also has a probability of hitting a resource object. It can be understood that a ratio value of the blendtree may be determined based on different heights of the first interaction area. A specific height to which the first virtual object jumps may be determined based on the ratio value. A smaller height of the first interaction area indicates a larger ratio value. A larger height of the first interaction area indicates a smaller ratio value. For the first virtual object, a larger height to which the first virtual object needs to jump indicates a larger ratio value, and a smaller height to which the first virtual object needs to jump indicates a smaller ratio value.

Figure 11:
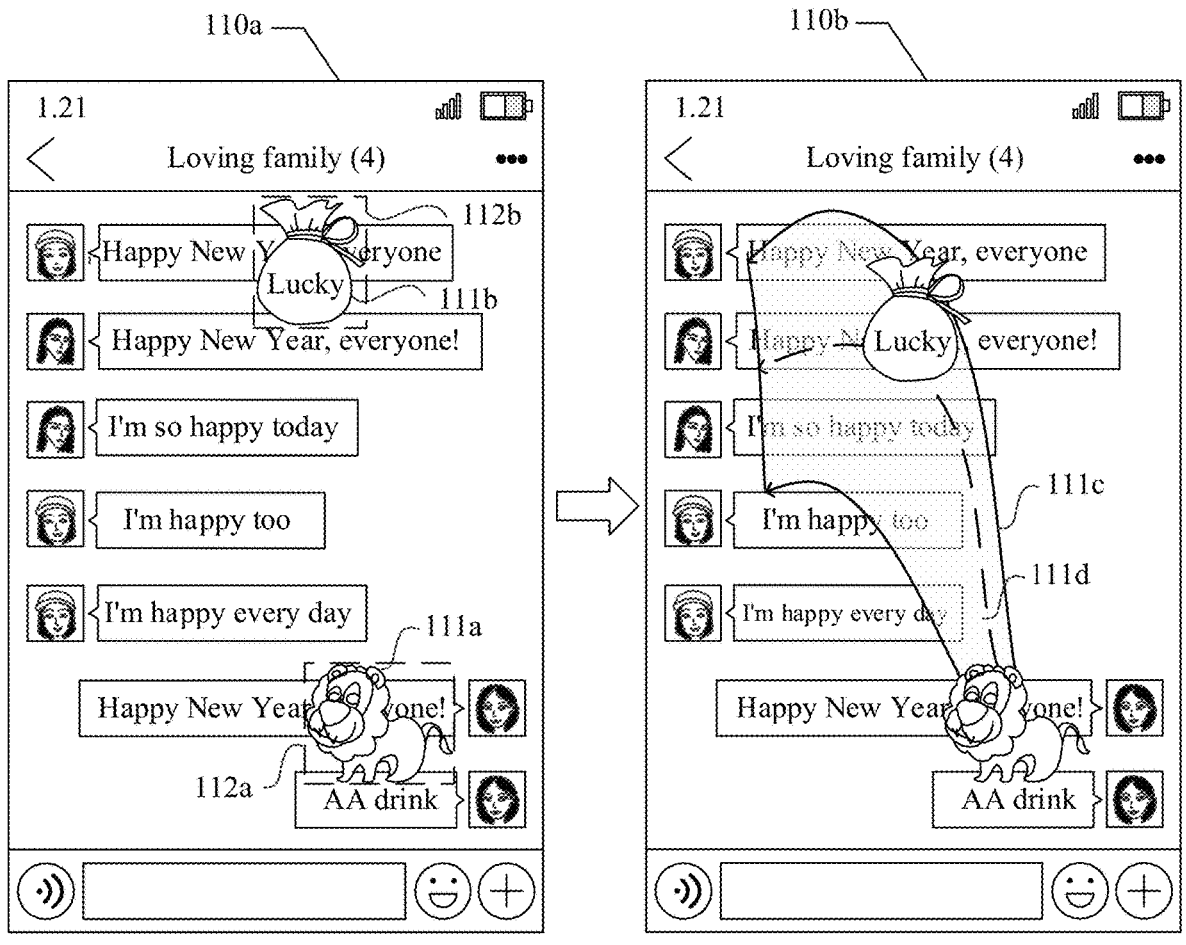
FIG. 11 is a schematic diagram showing a scenario of determining a moving track according to an embodiment of this application.

For ease of understanding, refer to FIG. 11. FIG. 11 is a schematic diagram showing a scenario of determining a moving track according to an embodiment of this application. An interaction interface 110a and an interaction interface 110b shown in FIG. 11 may be interaction interfaces of the application client at different moments. The interaction interface 110a may be the interaction interface 60b in the embodiment corresponding to FIG. 6. The interaction interface 110a may include a virtual object 111a and a resource object 111b.

As shown in FIG. 11, the application client may determine a display location 112a of the virtual object 111a and a display location 112b of the resource object 111b on the interaction interface 110a, determine a height difference between the display location 112a and the display location 112b, and then generate a virtual area 111c on the interaction interface 110a based on the display location 112a and the determined height difference. The virtual area 111c may include a plurality of moving tracks, and starting points of the plurality of moving tracks are all the display location 112a. A quantity of moving tracks herein is not limited in this embodiment of this application.

It can be understood that the plurality of moving tracks in the virtual area 111c each has a lateral velocity, a longitudinal velocity, a lateral acceleration, and a longitudinal acceleration, and the lateral velocity, the longitudinal velocity, the lateral acceleration, and the longitudinal acceleration are adjustable. One of the plurality of moving tracks can be uniquely determined based on the lateral velocity, the longitudinal velocity, the lateral acceleration, and the longitudinal acceleration. In addition, the moving tracks have different ending points, and the ending points may or may not be on the interaction interface 110b.

The virtual area 111c shown in FIG. 11 may include a moving track 111d. The moving track may be a target moving track determined by the application client in the virtual area 111c. When the virtual object 111a performs a jump action based on the moving track 111d, the display location 112a inevitably coincides with the display location 112b.

S2034: Select a selected moving track based on selection probabilities respectively corresponding to the target moving track and the auxiliary moving track.

The selected moving track is the target moving track or the auxiliary moving track. The target moving track and the auxiliary moving track may have a same selection probability or different selection probabilities. A value of the selection probability is not fixed.

It is to be understood that the application client may count a first consecutive non-collision count of a historical virtual object against the resource object in a target time period. The historical virtual object is associated with a historical interaction message on the interaction interface. To be specific, the historical virtual object is generated through triggering by the historical interaction message. The historical interaction message is transmitted by an object that performs interaction on the interaction interface. Herein, the object that performs interaction on the interaction interface may include a first object or a second object. Further, in a case that the first consecutive non-collision count is equal to a collision trigger threshold, the application client may adjust a selection probability corresponding to the target moving track to a maximum selection probability. Therefore, the application client may determine the target moving track as the selected moving track based on the maximum selection probability corresponding to the target moving track and a selection probability corresponding to the auxiliary moving track.

It can be understood that the first consecutive non-collision count may indicate a quantity of consecutive times that the historical virtual object does not collide with the resource object in the target time period. In a case that the counted first consecutive non-collision count does not reach the collision trigger threshold, the selection probabilities respectively corresponding to the target moving track and the auxiliary moving track may be the same. In a case that the counted first consecutive non-collision count reaches the collision trigger threshold (that is, the first consecutive non-collision count is equal to the collision trigger threshold), the application client may adjust the selection probabilities respectively corresponding to the target moving track and the auxiliary moving track, so that the application client can select the target moving track (namely, the selected moving track) in the virtual area.

Therefore, through adjustment of the selection probabilities respectively corresponding to the target moving track and the auxiliary moving track, N jump actions performed by the application client on the historical virtual object definitely include an interactive action performed by the historical virtual object with respect to the resource object. Herein, N may be a positive integer, and the collision trigger threshold may be a positive integer less than N. For example, the collision trigger threshold may be equal to (N−1). For example, in a case that N is equal to 5, (N−1) may be equal to 4. The target moving track and the auxiliary moving track have a same selection probability at the 1st time to the 4th time. In a case that, no interactive action is performed on the resource object within the 1st time to the 4th time, the application client may update the selection probabilities of the target moving track and the auxiliary moving track.

Optionally, the first consecutive non-collision count may alternatively indicate a quantity of consecutive times that the historical virtual object does not collide with a historical resource object in the target time period. The historical resource object herein is associated with the historical interaction message on the interaction interface. To be specific, the historical resource object is generated through triggering by the historical interaction message. Therefore, the application client may count the first consecutive non-collision count of the historical virtual object against the historical resource object in the target time period. The historical virtual object may include the first virtual object, and the historical resource object may include the resource object.

It is to be understood that the application client may recount the first consecutive non-collision count in a case that the display location of the first virtual object is above the display location of the resource object. In a case that transmission frequency of interaction messages on the interaction interface is excessively high, the first interaction area in which the first interaction message is located may be pushed up. Consequently, the display location of the first virtual object is above the display location of the resource object. The first virtual object cannot push up a resource object whose display location is below the first interaction area. In this way, when the display location of the resource object is below the display location of the first virtual object, limit logic that N jumps definitely include a collision fails. In this case, the first virtual object may randomly jump upward until the display location of the resource object is above a subsequent interaction area. Then N is cleared, and a recount starts.

Optionally, in a case that transmission frequency of interaction messages on the interaction interface causes the first interaction message to be no longer displayed on the interaction interface, the first interaction area in which the first interaction message is located is no longer displayed on the interaction interface, and the application client does not need to display the first virtual object on the interaction interface.

Figure 12:
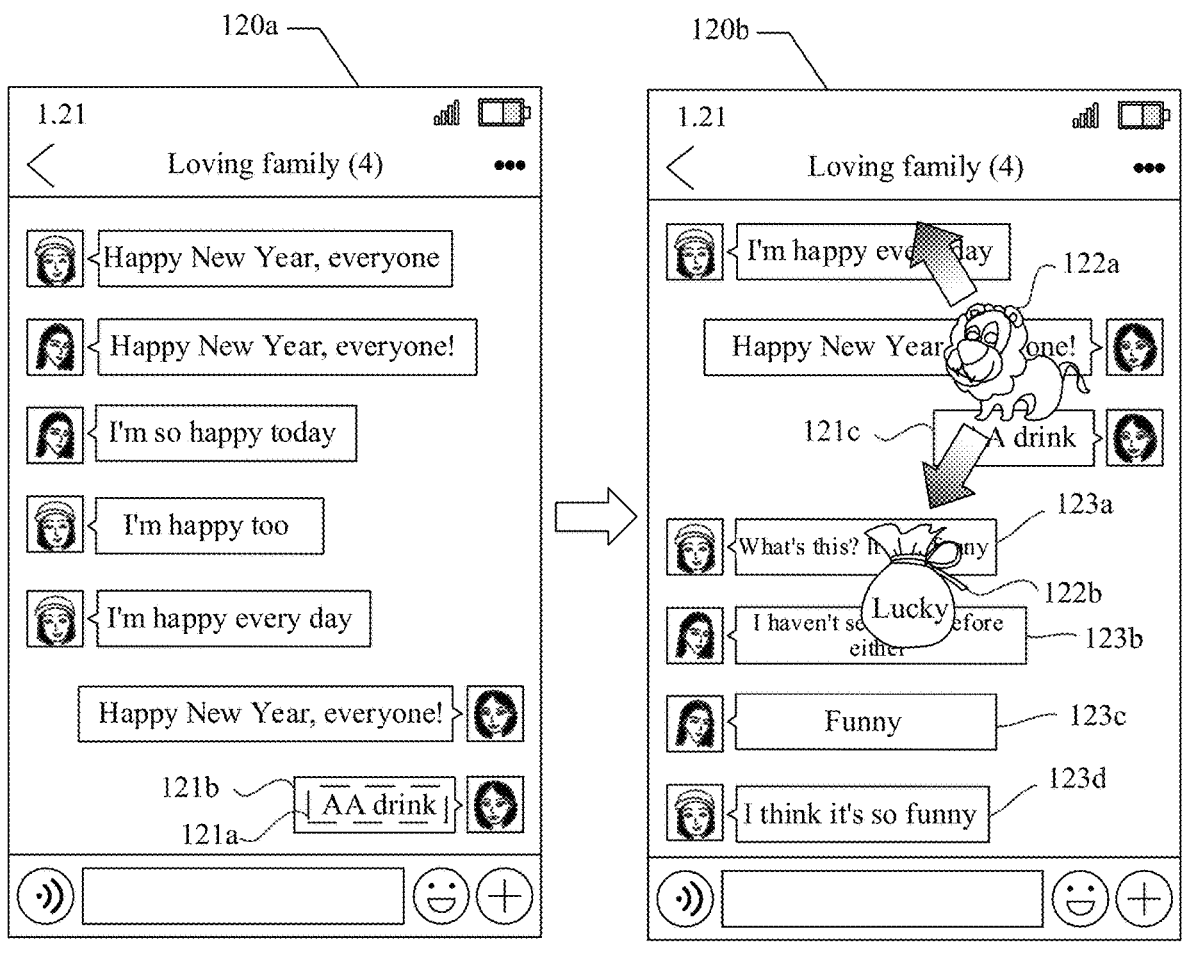
FIG. 12 is a schematic diagram showing a scenario of displaying a plurality of interaction messages according to an embodiment of this application.

For ease of understanding, refer to FIG. 12. FIG. 12 is a schematic diagram showing a scenario of displaying a plurality of interaction messages according to an embodiment of this application. An interaction interface 120a and an interaction interface 120b shown in FIG. 12 may be interaction interfaces of the application client at different moments.

As shown in FIG. 12, when the first object transmits an interaction message 121a through the application client, the application client may display the interaction message 121a on the interaction interface 120a. When the interaction message 121a is displayed on the interaction interface 120a, if the application client receives a large quantity of interaction messages and a location of an interaction area 121b in which the interaction message 121a is located changes on the interaction interface, the application client displays a virtual object 122a associated with the interaction message 121a in a changed interaction area 121b (namely, an interaction area 121c). A location of a resource object 122b on the interaction interface is shown in the interaction interface 120b. The large quantity of interaction messages received by the application client may be an interaction message 123a, an interaction message 123b, an interaction message 123c, and an interaction message 123d shown in the interaction interface 120b.

As shown in the interaction interface 120b in FIG. 12, in a case that a display location of the virtual object 122a is above a display location of the resource object 122b, the virtual object 122a performs a jump action upward. In this way, the jump action definitely causes no interactive action to the resource object 122b. Therefore, the application client may recount the first consecutive non-collision count.

Optionally, in a case that the display location of the virtual object 122a is above the display location of the resource object 122b, the virtual object 122a may alternatively perform a jump action downward. In this way, the jump action may cause an interactive action to the resource object 122b. Therefore, the application client does not need to recount the first consecutive non-collision count.

S2035: Move and display the first virtual object based on the selected moving track from the location of the first interaction area.

It is to be understood that the first virtual object may include one jump action during movement and display, and a quantity, corresponding to the first jump action, of consecutive times of non-collision with the historical resource object may be the first consecutive non-collision count. Optionally, the first virtual object may alternatively perform at least two jump actions during movement and display, the jump actions are respectively performed based on different selected moving tracks, and the selected moving tracks respectively corresponding to the jump actions are determined based on different virtual areas.

It is to be understood that, in a case that the first virtual object performs at least two jump actions, a specific process of displaying the first virtual object by the application client may be described as follows: The application client may count a second consecutive non-collision count of consecutive non-collision jump actions of the first virtual object against the resource object. Further, in a case that the second consecutive non-collision count is equal to a collision trigger threshold, the application client may generate an updated virtual area based on the display location of the first virtual object in movement and the display location of the resource object in movement. The updated virtual area includes an updated target moving track and an updated auxiliary moving track. The updated target moving track is used for indicating that there is a coincident display location between the display location of the first virtual object in movement and the display location of the resource object in movement. The updated auxiliary moving track is different from the updated target moving track. The updated target moving track has a maximum selection probability, and a selection probability corresponding to the updated auxiliary moving track being less than the maximum selection probability. Further, the application client may determine the updated target moving track as an updated selected moving track based on the maximum selection probability corresponding to the updated target moving track and the selection probability corresponding to the updated auxiliary moving track. Further, the application client may perform, on the first virtual object, a jump action indicated by the updated selected moving track.

It can be understood that the second consecutive non-collision count may indicate a quantity of consecutive times that the first virtual object does not collide with the resource object. In a case that the counted second consecutive non-collision count reaches the collision trigger threshold (to be specific, the second consecutive non-collision count is equal to the collision trigger threshold), the application client may generate the updated virtual area for the first virtual object on the interaction interface, and then adjust selection probabilities respectively corresponding to the updated target moving track and the updated auxiliary moving track, so that the application client can select the updated target moving track (namely, the updated selected moving track) in the updated virtual area.

Optionally, the second consecutive non-collision count may alternatively indicate a quantity of consecutive times that the historical virtual object does not collide with the resource object. In this way, in a case that the second consecutive non-collision count is the last jump action performed by the first virtual object, the application client may adjust a target moving track corresponding to a next virtual object (for example, a virtual object D) of the first virtual object, so that a jump action performed by the virtual object D causes an interactive action to the resource object. Optionally, the second consecutive non-collision count may alternatively indicate a quantity of consecutive times that the historical virtual object does not collide with a historical resource object.

For a specific process of generating the updated virtual area by the application client, refer to the foregoing descriptions of generating the virtual area. For a specific process of generating the updated target moving track and the updated auxiliary moving track by the application client, refer to the foregoing descriptions of generating the target moving track and the auxiliary moving track.

It can be learned that, in this embodiment of this application, the object location distance between the display location of the first virtual object and the display location of the resource object may be obtained, the virtual area indicated by the object location distance is generated on the interaction interface, and then the first virtual object is moved and displayed on the interaction interface based on the selected moving track selected from the virtual area. It can be understood that, in this embodiment of this application, the selected moving track may be randomly selected for the first virtual object on the interaction interface, and then the first virtual object is moved and displayed based on the selected moving track, thereby improving flexibility of moving and displaying the first virtual object on the interaction interface.

Further, FIG. 13 is a schematic flowchart of a data processing method according to an embodiment of this application. The method may be performed by a server, an application client, or both a server and an application client. The server may be the server 20a in the embodiment corresponding to FIG. 2A. The application client may be the first client on the terminal device 20b in the embodiment corresponding to FIG. 2A. For ease of understanding, an example in which the method is performed by the application client is used for description in this embodiment of this application. The data processing method may include the following S301 to S305.

S301: In a case that a first interaction message is displayed on an interaction interface, display a first virtual object in a first interaction area in which the first interaction message is located.

The first interaction message is transmitted by a first object. The first virtual object is associated with the first interaction message.

For a specific process of displaying, by the application client, the first virtual object in the first interaction area, refer to the descriptions of S101 in the embodiment corresponding to FIG. 3. Details are not described herein again.

S302: Move and display, on the interaction interface, the first virtual object from a location of the first interaction area.

For a specific process of moving and displaying, by the application client, the first virtual object on the interaction interface, refer to the descriptions of S203 in the embodiment corresponding to FIG. 5 and the descriptions of S2031 to S2035 in the embodiment corresponding to FIG. 10. Details are not described herein again.

S303: In a case that a second interaction message is displayed on the interaction interface, display a second virtual object in a second interaction area in which the second interaction message is located.

Specifically, in a case that the second interaction message is displayed on the interaction interface, the application client may determine trigger types respectively indicated by the first interaction message and the second interaction message. The second interaction message is transmitted by a second object. The second virtual object is associated with the second interaction message. The second object is an object interacting with the first object on the interaction interface. The first interaction message transmitted by the first object and the second interaction message transmitted by the second object may be interaction messages transmitted by the first object and the second object at different moments. Further, in a case that a trigger type indicated by the first interaction message and a trigger type indicated by the second interaction message are both an interactive type, the application client may display the second virtual object (that is, superpose interactive effects) in the second interaction area in which the second interaction message is located.

Optionally, the second interaction message may also be transmitted by the first object. To be specific, the first interaction message and the second interaction message may be interaction messages transmitted by the first object at different moments. In this case, in a case that a trigger type indicated by the first interaction message and a trigger type indicated by the second interaction message are both an interactive type, the application client may display, in the second interaction area in which the second interaction message is located, the second virtual object associated with the second interaction message. For ease of understanding, an example in which the first interaction message is transmitted by the first object and the second interaction message is transmitted by the second object is used for description in this embodiment of this application.

The trigger type may include the interactive type and a common type. Optionally, in a case that a trigger type indicated by the first interaction message or a trigger type indicated by the second interaction message is not the interactive type, the application client does not need to display the second virtual object (that is, does not superpose interactive effects) in the second interaction area in which the second interaction message is located. In this case, the first interaction message or the second interaction message belongs to the common type.

For a specific process of displaying, by the application client, the second virtual object in the second interaction area, refer to the descriptions of displaying the first virtual object in the first interaction area in S101 in the embodiment corresponding to FIG. 3. Details are not described herein again.

S304: Move and display, on the interaction interface, the second virtual object from a location of the second interaction area.

Both the first virtual object and the second virtual object are displayed on the interaction interface, and the first virtual object and the second virtual object have an interaction function, i.e., the first virtual object and the second virtual object can interact with each other. It is to be understood that, for a specific process of moving and displaying, by the application client, the second virtual object on the interaction interface, reference may be made to the foregoing descriptions of moving and displaying the first virtual object. Details are not described herein again.

It is to be understood that, in response to a trigger operation performed on the first virtual object in movement, the application client may obtain an updated moving track (namely, a first updated moving track) and an updated moving speed (namely, a first updated moving speed) indicated by the trigger operation. Further, the application client may update an initial moving track and an initial moving speed of the first virtual object on the interaction interface based on the updated moving track and the updated moving speed.

Similarly, in response to a trigger operation performed on the second virtual object in movement, the application client may obtain an updated moving track (namely, a second updated moving track) and an updated moving speed (namely, a second updated moving speed) indicated by the trigger operation. Further, the application client may update an initial moving track and an initial moving speed of the second virtual object on the interaction interface based on the updated moving track and the updated moving speed.

Figure 14:
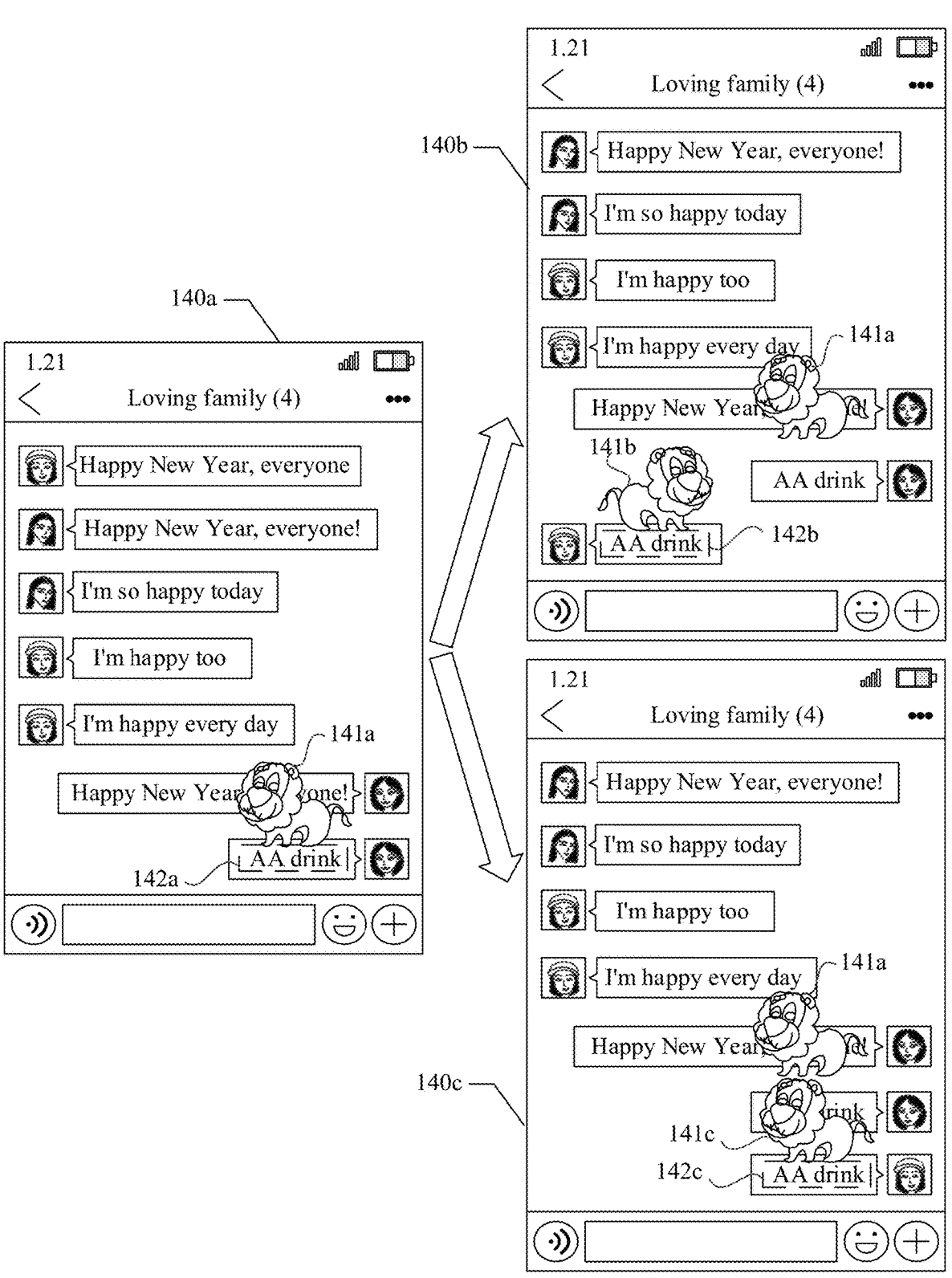
FIG. 14 is a schematic diagram showing a scenario of displaying a second virtual object according to an embodiment of this application.

For ease of understanding, refer to FIG. 14. FIG. 14 is a schematic diagram showing a scenario of displaying a second virtual object according to an embodiment of this application. An interaction interface 140a and an interaction interface 140b shown in FIG. 14 may be interaction interfaces of the application client at different moments. The interaction interface 140a and an interaction interface 140c shown in FIG. 14 may be interaction interfaces of the application client at different moments. In a case that both the first interaction message (namely, an interaction message 142a) and the second interaction message (namely, an interaction message 142c) are transmitted by the first object, the interaction interface may switch from the interaction interface 140a to the interaction interface 140c. In a case that the first interaction message (namely, the interaction message 142a) is transmitted by the first object and the second interaction message (namely, an interaction message 142b) is transmitted by the second object, the interaction interface may switch from the interaction interface 140a to the interaction interface 140b.

As shown in FIG. 14, the interaction message 142a and a virtual object 141a associated with the interaction message 142a may be displayed on the interaction interface 140a. It can be understood that, in a case that the first object transmits the interaction message 142c, the application client may display the interaction message 142c and a virtual object 141c associated with the interaction message 142c on the interaction interface 140c. Display locations of the virtual object 141a on the interaction interface 140a and the interaction interface 140c change.

It can be understood that, in a case that the second object transmits the interaction message 142b, the application client may display the interaction message 142b and a virtual object 141b associated with the interaction message 142b on the interaction interface 140b. Display locations of the virtual object 141a on the interaction interface 140a and the interaction interface 140b change.

S305: In a case that a display location of the first virtual object in movement coincides with a display location of the second virtual object in movement during joint movement of the first virtual object and the second virtual object, display, on the interaction interface, a coincident interactive animation associated with the first virtual object and the second virtual object.

It is to be understood that the application client may add a first virtual detection area for the first virtual object, and add a second virtual detection area for the second virtual object. Further, during movement of the first virtual object and the second virtual object, the application client may generate an area-coincidence degree (namely virtual coincidence degree) between the first virtual detection area and the second virtual detection area based on an area intersection and an area union between the first virtual detection area and the second virtual detection area. Further, in a case that the virtual area-coincidence degree is greater than a coincidence degree threshold, the application client may determine that the display location of the first virtual object in movement coincides with the display location of the second virtual object in movement. Optionally, in a case that the first virtual detection area and the second virtual detection area have an intersection, the application client may alternatively determine that the display location of the first virtual object in movement coincides with the display location of the second virtual object in movement.

For a specific process of determining, by the application client, whether the display location of the first virtual object in movement coincides with the display location of the second virtual object in movement, refer to the foregoing descriptions of determining whether the display location of the first virtual object in movement coincides with the display location of the resource object in movement in the embodiment corresponding to FIG. 5. Details are not described herein again.

Optionally, in a case that the display location of the first virtual object in movement coincides with the display location of the second virtual object in movement, the application client may display the second virtual object under the first virtual object, or display the first virtual object under the second virtual object.

Figure 15:
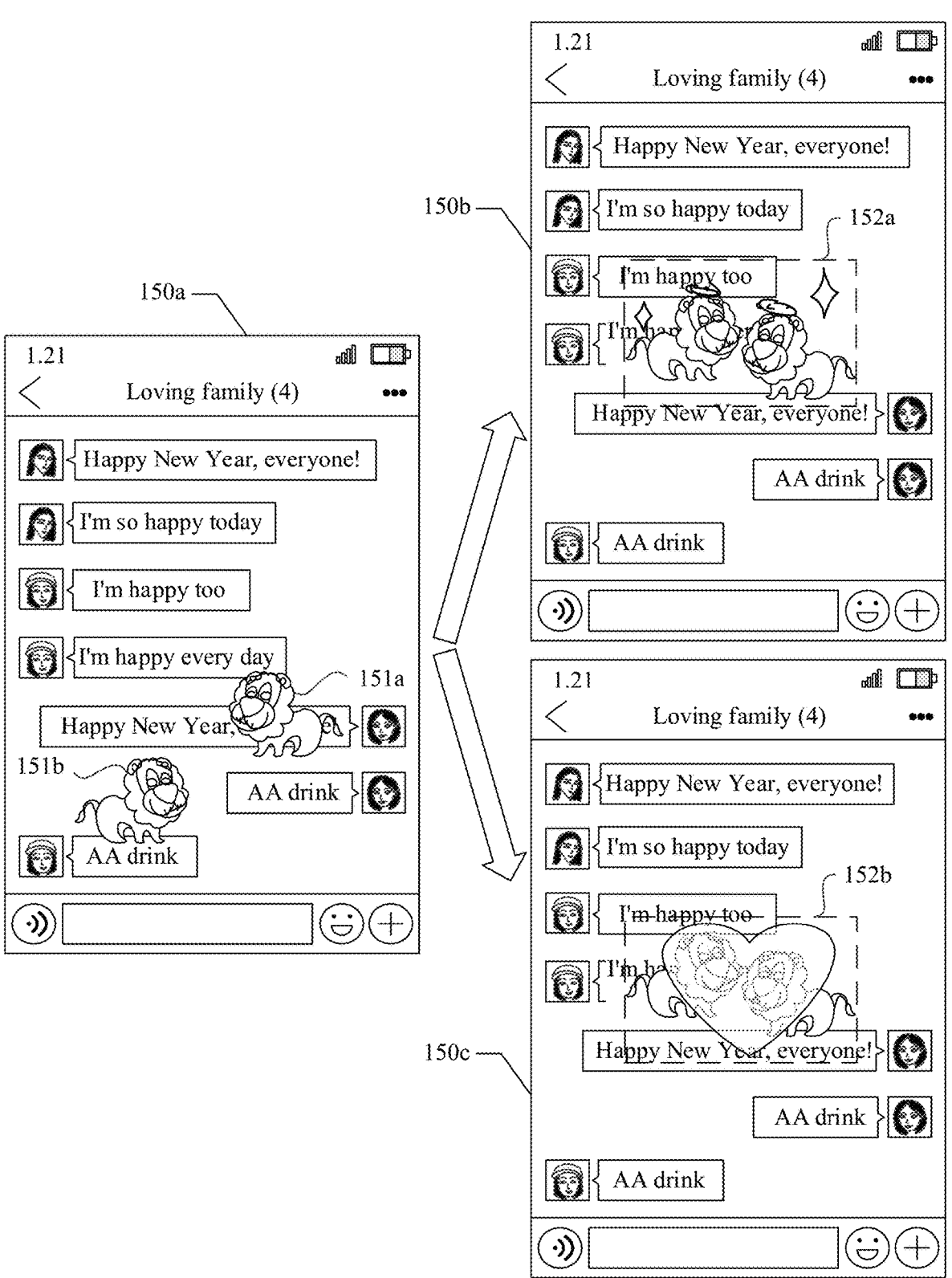
FIG. 15 is a schematic diagram showing a scenario of displaying a coincident interactive animation according to an embodiment of this application.

For ease of understanding, refer to FIG. 15. FIG. 15 is a schematic diagram showing a scenario of displaying a coincident interactive animation according to an embodiment of this application. An interaction interface 150a and an interaction interface 150b shown in FIG. 15 may be interaction interfaces of the application client at different moments. The interaction interface 150a and an interaction interface 150c shown in FIG. 15 may be interaction interfaces of the application client at different moments. The interaction interface 150b and the interaction interface 150c may be different coincident interactive animations displayed by the application client.

As shown in FIG. 15, the interaction interface 150a may include a virtual object 151a and a virtual object 151b, and the virtual object 151a and the virtual object 151b jointly move on the interaction interface 150a. In a case that a display location of the virtual object 151a in movement coincides with a display location of the virtual object 151b in movement, the application client may switch from the interaction interface 150a to the interaction interface 150b or the interaction interface 150c. Both the virtual object 151a and the virtual object 151b may be lions.

It can be understood that the application client may display a coincident interactive animation 152a on the interaction interface 150b, and the coincident interactive animation 152a may display dizziness effects on the lions represented by the virtual object 151a and the virtual object 151b, and provide shiny visual effects on the interaction interface.

It can be understood that the application client may display a coincident interactive animation 152b on interaction interface 150c, and the coincident interactive animation 152b may display heart effects on the lions represented by the virtual object 151a and the virtual object 151b. The heart effects may be generated between the lions, and is continuously enlarged on interaction interface 150c over time.

It can be learned that, the first virtual object is moved and displayed from the first interaction area associated with the first object, and the second virtual object is displayed from the second interaction area associated with the second object, so that a personalized virtual object display mode can be implemented. In addition, for the first virtual object associated with the first object and the second virtual object associated with the second object, the first virtual object and the second virtual object may be displayed on the interaction interface in a superposed manner, and the first virtual object and the second virtual object can interact with each other on the interaction interface, to enrich display effects of virtual objects associated with interaction messages.

Further, FIG. 16 is a schematic flowchart of a data processing method according to an embodiment of this application. The method may be performed by a server, an application client, or both a server and an application client. The server may be the server 20a in the embodiment corresponding to FIG. 2A. The application client may be the first client on the terminal device 20b in the embodiment corresponding to FIG. 2A. For ease of understanding, an example in which the method is performed by the application client is used for description in this embodiment of this application. The data processing method may include the following S401 to S409.

S401: In a case that a first interaction message is displayed on an interaction interface, display a first virtual object in a first interaction area in which the first interaction message is located.

The first interaction message is transmitted by a first object. The first virtual object is associated with the first interaction message.

For a specific process of displaying, by the application client, the first virtual object in the first interaction area, refer to the descriptions of S101 in the embodiment corresponding to FIG. 3. Details are not described herein again.

S402: In a case that the first virtual object is displayed in the first interaction area, display a resource object at a target location on the interaction interface.

The resource object is associated with the first interaction message. The resource object and the first virtual object have an interaction function, i.e., the resource object ant the first virtual object can interact with each other.

For a specific process of displaying, by the application client, the resource object on the interaction interface, refer to the descriptions of S202 in the embodiment corresponding to FIG. 5. Details are not described herein again.

S403: Move and display, on the interaction interface, the first virtual object from a location of the first interaction area.

For a specific process of moving and displaying, by the application client, the first virtual object on the interaction interface, refer to the descriptions of S203 in the embodiment corresponding to FIG. 5 and the descriptions of S2031 to S2035 in the embodiment corresponding to FIG. 10. Details are not described herein again.

S404: Move and display, on the interaction interface, the resource object from the target location.

For a specific process of moving and displaying, by the application client, the resource object on the interaction interface, refer to the descriptions of S204 in the embodiment corresponding to FIG. 5. Details are not described herein again.

S405: In a case that a second interaction message is displayed on the interaction interface, display a second virtual object in a second interaction area in which the second interaction message is located.

The second interaction message is transmitted by a second object. The second virtual object is associated with the second interaction message. The second object is an object interacting with the first object on the interaction interface. The resource object and the second virtual object have an interaction function, i.e., the resource object and the second virtual object can interact with each other. For a specific process of interaction between the second virtual object and the resource object, refer to the following descriptions of S407 to S409.

For a specific process of displaying, by the application client, the second virtual object in the second interaction area, refer to the descriptions of S303 in the embodiment corresponding to FIG. 13. Details are not described herein again.

It can be understood that the application client does not need to display the resource object at the target location on the interaction interface in a case that the second virtual object is displayed in the second interaction area. Optionally, in a case that the first virtual object is displayed in the first interaction area, the resource object displayed at the target location on the interaction interface may be a first resource object; and in a case that the second virtual object is displayed in the second interaction area, the application client may display a second resource object at the target location of the interaction interface. In this way, display locations of a plurality of virtual objects on the interaction interface may coincide display locations of a plurality of resource objects. That is, interactive actions may be performed between the plurality of virtual objects and the plurality of resource objects. For ease of understanding, an example in which a maximum of one resource object is displayed on the interaction interface at one moment is used for description in this embodiment of this application.

S406: Move and display, on the interaction interface, the second virtual object from a location of the second interaction area.

The first virtual object, the second virtual object, and the resource object are all displayed on the interaction interface.

Similarly, in a case that a third interaction message is displayed on the interaction interface, the application client may display the third virtual object in a third interaction area in which the third interaction message is located, and then move and display, on the interaction interface, the third virtual object from a location of the third interaction area. The third interaction message herein may be transmitted by the first object, the second object, or another object perform interaction. For a specific process of moving and displaying, by the application client, the third virtual object on the interaction interface, refer to the foregoing descriptions of displaying, and moving and displaying the first virtual object on the interaction interface. Details are not described herein again.

It is to be understood that, during movement of the resource object, the application client may display a resource acquisition area on the interaction interface in response to a trigger operation performed on the resource object in movement. Further, the application client may display resource description information and a resource acquisition control in the resource acquisition area. Further, the application client may acquire a virtual resource indicated by the resource description information in response to a trigger operation performed on the resource acquisition control. Optionally, the application client may alternatively display the resource acquisition area on the interaction interface in a case that the display location of the resource object coincides with the display location of the first virtual object (or the second virtual object).

The resource acquisition area may further include a close control. The resource acquisition area herein may be a sub-interface independent of the interaction interface. The application client may close the resource acquisition area on the interaction interface and cancel display of the resource object on the interaction interface in response to a trigger operation performed on the close control.

Figure 17:
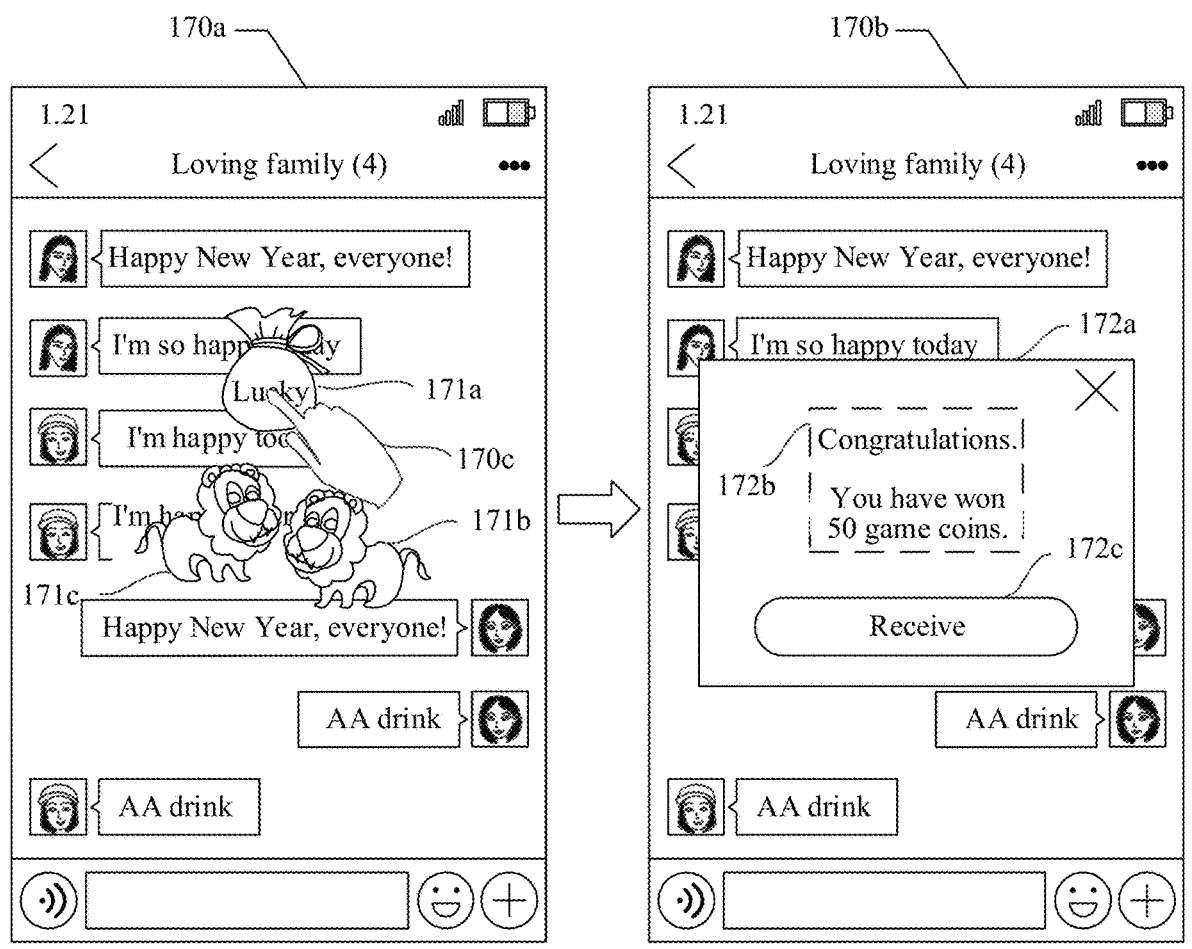
FIG. 17 is a schematic diagram showing a scenario of acquiring a virtual resource according to an embodiment of this application.

For ease of understanding, refer to FIG. 17. FIG. 17 is a schematic diagram showing a scenario of acquiring a virtual resource according to an embodiment of this application. An interaction interface 170a and an interaction interface 170b shown in FIG. 17 may be interaction interfaces of the application client at different moments. A first virtual object, a second virtual object, and a resource object may be simultaneously displayed on the interaction interface 170a. The first virtual object herein may be a virtual object 171b, the second virtual object herein may be a virtual object 171c, and the resource object herein may be a resource object 171a.

As shown in FIG. 17, in a case that a first object 170c needs to acquire a virtual resource indicated by the resource object 171a (that is, the first object may tap "Lucky bag" to acquire welfare awards), the first object 170c may perform a trigger operation on the resource object 171a. In this way, the application client may display a resource acquisition area 172a on the interaction interface 170a in response to the trigger operation performed by the first object 170c on the resource object 171a, to obtain the interaction interface 170b (that is, go to a welfare acquisition page). The resource acquisition area 172a may include resource description information 172b and a resource acquisition control 172c associated with a virtual resource.

It can be understood that the first object 170c may perform a trigger operation on the resource acquisition control 172c in a case that the first object 170c needs to obtain a virtual resource indicated by the resource description information 172b. In this way, the application client may acquire the virtual resource indicated by the resource description information 172b in response to the trigger operation performed by the first object 170c on the resource acquisition control 172c. The resource description information 172b may be "Congratulations. You have won 50 game coins." The virtual resource may be "50 game coins."

S407: In a case that a display location of the second virtual object in movement coincides with a display location of the resource object in movement during joint movement of the first virtual object, the second virtual object, and the resource object, trigger the second virtual object to perform an interactive action with respect to the resource object.

A location of the resource object is shifted on the interaction interface based on the interactive action.

It is to be understood that the application client may add a virtual detection area (namely, a second virtual detection area) for the second virtual object, and add a resource detection area for the resource object. Further, during movement of the second virtual object and the resource object, the application client may generate an area-coincidence degree (namely, a second area-coincidence degree) between the virtual detection area and the resource detection area based on an area intersection and an area union between the virtual detection area and the resource detection area. Further, in a case that the area-coincidence degree is greater than a coincidence degree threshold, the application client may determine that the display location of the second virtual object in movement coincides with the display location of the resource object in movement. Optionally, in a case that the second virtual detection area and the resource detection area have an intersection, the application client may alternatively determine that the display location of the second virtual object in movement coincides with the display location of the resource object in movement.

For a specific process of determining, by the application client, whether the display location of the second virtual object in movement coincides with the display location of the resource object in movement, refer to the foregoing descriptions of determining whether the display location of the first virtual object in movement coincides with the display location of the resource object in movement in the embodiment corresponding to FIG. 5. Details are not described herein again.

S408: Display, at a display location of the resource object whose location has been shifted, a second resource sub-object matching the second interaction message.

The second resource sub-object has a function of moving on the interaction interface.

Similarly, in a case that a display location of the first virtual object in movement coincides with a display location of the resource object in movement during joint movement of the first virtual object, the second virtual object, and the resource object, the application client may trigger the first virtual object to perform an interactive action with respect to the resource object. A location of the resource object is shifted on the interaction interface based on the interactive action. Further, the application client may display, at a display location of the resource object whose location has been shifted, a first resource sub-object matching the first interaction message. The first resource sub-object has a function of moving on the interaction interface.

It can be understood that the first resource sub-object matching the first interaction message and the second resource sub-object matching the second interaction message are the same in a case that the first interaction message and the second interaction message include same key message data. For example, key message data included in the first interaction message and key message data included in the second interaction message are both "AA drink," and the first resource sub-object and the second resource sub-object are both "AA drink bottle." For another example, in a case that key message data included in the first interaction message is "AA drink" and key message data included in the second interaction message is "BB drink," the first resource sub-object may be "AA drink bottle," and the second resource sub-object may be "BB drink bottle."

Optionally, during movement of the second resource sub-object, the application client may display a sub-resource acquisition area on the interaction interface in response to a trigger operation performed on the second resource sub-object in movement. Further, the application client may display sub-resource description information and a sub-resource acquisition control in the sub-resource acquisition area. Further, the application client may acquire a virtual sub-resource indicated by the sub-resource description information in response to a trigger operation performed on the sub-resource acquisition control. It is to be understood that, for a specific process of responding, by the application client, to a trigger operation performed on the first resource sub-object in movement, reference may be made to the descriptions of responding to the trigger operation performed on the second resource sub-object in movement. Details are not described herein again.

S409: Continue to move and display, on the interaction interface, the resource object whose location has been shifted.

It can be understood that the application client may further move and display the second resource sub-object (or the first resource sub-object), continue to move and display the first virtual object, and continue to move and display the second virtual object on the interaction interface. A resource trajectory of the second virtual object (or the first virtual object) does not change due to interaction (for example, collision) with the resource object.

Figure 18:
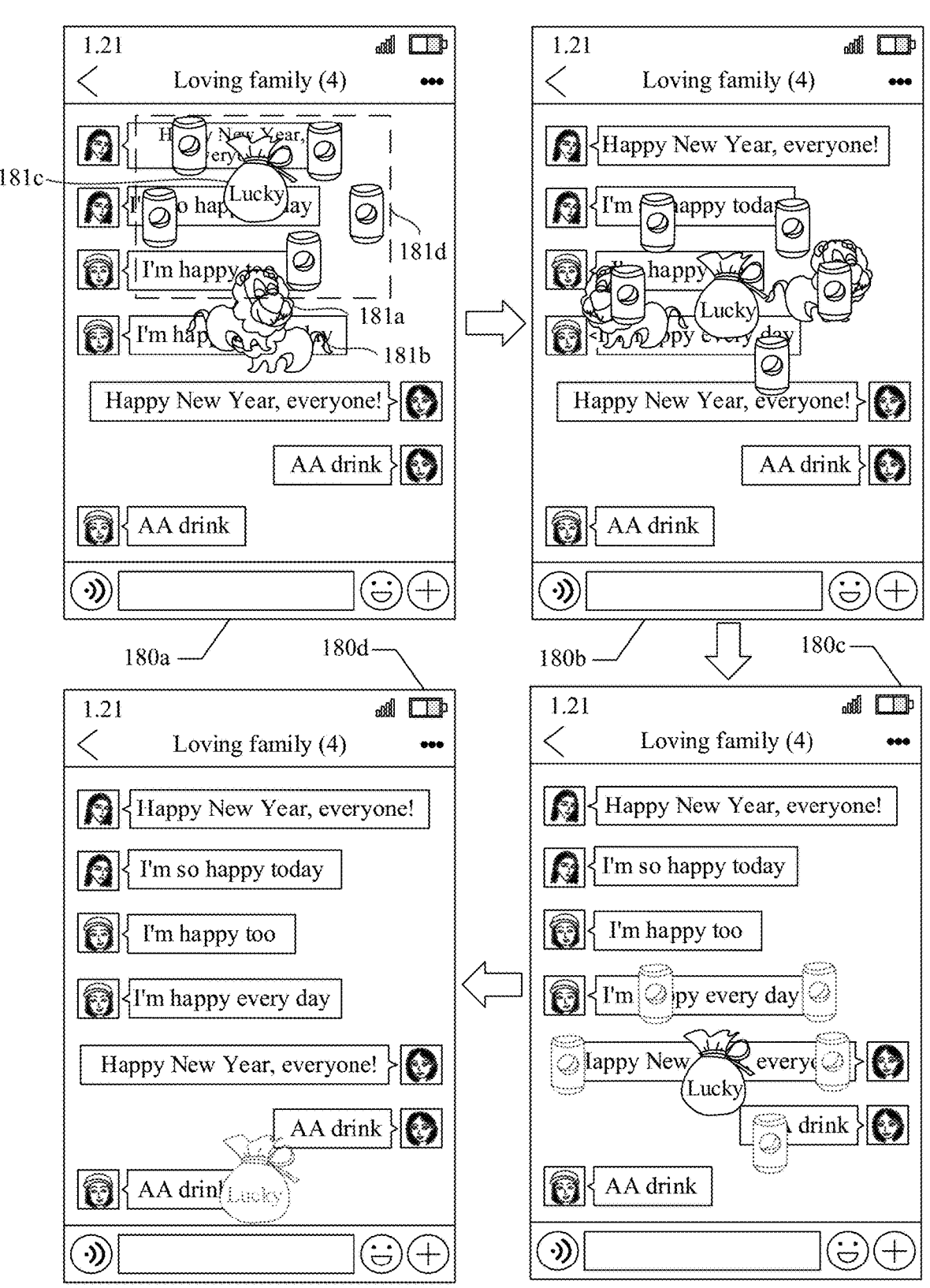
FIG. 18 is a schematic diagram showing a scenario of performing an interactive action according to an embodiment of this application.

For a specific process of displaying, by the application client, the second resource sub-object, the first virtual object, the second virtual object, and the resource object on the interaction interface, refer to FIG. 18. FIG. 18 is a schematic diagram showing a scenario of performing an interactive action according to an embodiment of this application. An interaction interface 180a, an interaction interface 180b, an interaction interface 180c, and an interaction interface 180d shown in FIG. 18 may be interaction interfaces of the application client at different moments. The interaction interface 180a may be the interaction interface 21d in the embodiment corresponding to FIG. 2A. The interaction interface 180a may include the first virtual object (namely, a virtual object 181b), the second virtual object (namely, a virtual object 181a), and the resource object (namely, a resource object 181c).

As shown in FIG. 18, the application client may trigger the virtual object 181a to perform an interactive action with respect to the resource object 181c, to shift a location of the resource object 181c on the interaction interface 180a. In addition, the application client may display a resource sub-object 181d at a display location of the resource object 181c. A plurality of (for example, five) "AA drink bottles" shown in FIG. 18 may be collectively referred to as the resource sub-object 181d.

As shown in FIG. 18, during switching from the interaction interface 180a to the interaction interface 180b, the resource sub-object 181d is moved and displayed on the interaction interface 180b, and the virtual object 181b, the virtual object 181a, and the resource object 181c also continue to move and be displayed on the interaction interface 180b.

It is to be understood that the resource sub-object 181d gradually fades during movement and display. To be specific, the resource sub-object 181d gradually fades during movement to a fixed location, until disappearance. The fixed location herein may be a middle location on the interaction interface. As shown in FIG. 18, during switching from the interaction interface 180b to the interaction interface 180c, the resource sub-object 181d continues to move and be displayed on the interaction interface 180c, and the resource sub-object 181d that is moving and displayed on the interaction interface 180c fades in color until disappearance. The virtual object 181b and the virtual object 181a disappear after moving to respective ending points. The resource object 181c continues to move and be displayed on the interaction interface 180c.

It is to be understood that the resource object 181c gradually fades when moving to an update location until disappearance. The update location herein may be a bottom location on the interaction interface. As shown in FIG. 18, during switching from the interaction interface 180c to the interaction interface 180d, the resource object 181c that is moving and displayed on the interaction interface 180d fades in color until disappearance. In addition, the resource object 181c may further display broken animation effects on the interaction interface 180d.

It can be understood that the resource sub-object 181d shown in FIG. 18 is the second resource sub-object associated with the second interaction message corresponding to the second virtual object. In a case that the application client triggers the virtual object 181b to perform an interactive action with respect to resource object 181c before or after the application client triggers the virtual object 181a to perform an interactive action on the resource object 181c, the application client may alternatively display both the resource sub-object 181d and the first resource sub-object associated with the first interaction message corresponding to virtual object 181b.

Optionally, in a case that the display location of the resource object does not coincide with the display location of the first virtual object, or the display location of the resource object does not coincide with the display location of the second virtual object, the resource object moves to an ending point of a resource trajectory based on the resource trajectory, until the resource object gradually fades and disappears at the ending point. Then a next interaction message re-triggers generation of a resource object of information. For example, the resource object keeps falling, and gradually fades and disappears after falling to the bottom of a screen.

Figure 19:
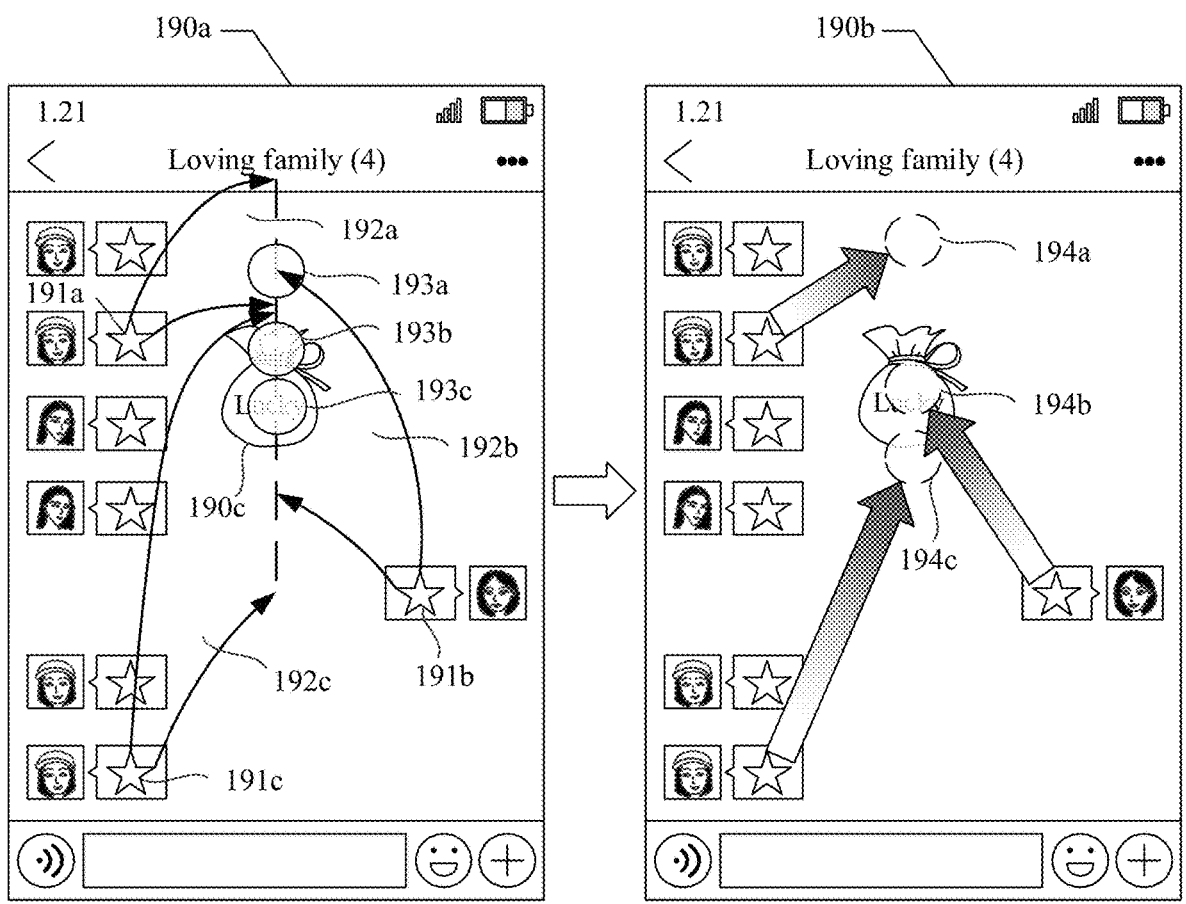
FIG. 19 is a schematic diagram showing a scenario of determining a jump height according to an embodiment of this application.

It is to be understood that, during movement of the first virtual object and the second virtual object on the interaction interface, jump actions are performed based on the moving track, and different jump actions correspond to different jump heights. For a specific process of determining, by the application client, a jump height corresponding to the first virtual object or the second virtual object, refer to FIG. 19. FIG. 19 is a schematic diagram showing a scenario of determining a jump height according to an embodiment of this application. An interaction interface 190a shown in FIG. 19 may include a plurality of interaction messages and a resource object 190c. The plurality of interaction messages may specifically include an interaction message 191a, an interaction message 191b, and an interaction message 191c. Herein, an example in which the interaction message 191a, the interaction message 191b, and the interaction message 191c all include key message data with a virtual object trigger function is used for description. The key message data herein may be a "five-pointed star."

As shown in FIG. 19, the application client may determine a height difference between an interaction area in which the interaction message 191a is located and a display location of the resource object 190c, and generate a virtual area 192a associated with the interaction message 191a based on the height difference; the application client may determine a height difference between an interaction area in which the interaction message 191b is located and the display location of the resource object 190c, and generate a virtual area 192b associated with the interaction message 191b based on the height difference; and the application client may determine a height difference between an interaction area in which the interaction message 191c is located and the display location of the resource object 190c, and generate a virtual area 192c associated with the interaction message 191c based on the height difference.

It can be understood that the virtual area 192a may include a moving track indicated by an ending location 193a, and the moving track indicated by the ending location 193a enables a virtual object associated with the interaction message 191a to be associated with the resource object 190c as much as possible; the virtual area 192b may include a moving track indicated by an ending location 193b, and the moving track indicated by the ending location 193b enables a virtual object associated with the interaction message 191b to be associated with the resource object 190c as much as possible; and the virtual area 192c may include a moving track indicated by an ending location 193c, and the moving track indicated by the ending location 193c enables a virtual object associated with the interaction message 191c to be associated with the resource object 190c as much as possible.

It is to be understood that the virtual object needs to be associated with the resource object 190c as much as possible. In this case, an ending point of a moving track of the virtual object associated with the interaction message 191a needs to be close to the ending location 193a as much as possible, an ending point of a moving track of the virtual object associated with the interaction message 191b needs to be close to the ending location 193b as much as possible, and an ending point of a moving track of the virtual object associated with the interaction message 191c needs to be close to the ending location 193c as much as possible.

Therefore, an ending location 194a shown in FIG. 19 may be an ending point of a moving track selected by the application client in the virtual area 192a for the virtual object associated with the interaction message 191a, an ending location 194b shown in FIG. 19 may be an ending point of a moving track selected by the application client in the virtual area 192b for the virtual object associated with the interaction message 191b, and an ending location 194c shown in FIG. 19 may be an ending point of a moving track selected by the application client in the virtual area 192c for the virtual object associated with the interaction message 191c.

It can be learned that, in this embodiment of this application, the first virtual object, the second virtual object, and the resource object may jointly move on the interaction interface. During joint movement of the first virtual object, the second virtual object, and the resource object, the first virtual object or the second virtual object may perform an interactive action with respect to the resource object, so that the location of the resource object on the interaction interface is shifted, and the first resource sub-object matching the first interaction message or the second resource sub-object matching the second interaction message is displayed at the display location of the resource object whose location has been shifted. Based on this, the first virtual object is moved and displayed from the first interaction area associated with the first object, and the second virtual object is displayed from the second interaction area associated with the second object, so that a personalized virtual object display mode can be implemented, and display effects of virtual objects associated with interaction messages are enriched (to be specific, different objects trigger different emoticon rain effects). In addition, for the first virtual object and the resource object that are associated with the first object and the second virtual object associated with the second object, the first virtual object, the resource object, and the second virtual object may be displayed on the interaction interface in a superposed manner, the first virtual object can interact with the second virtual object on the interaction interface, the first virtual object can interact with the resource object on the interaction interface, and the second virtual object can interact with the resource object on the interaction interface, so that flexibility of interaction on the interaction interface can be improved (to be specific, effects triggered by different objects can be linked).

Figure 20:
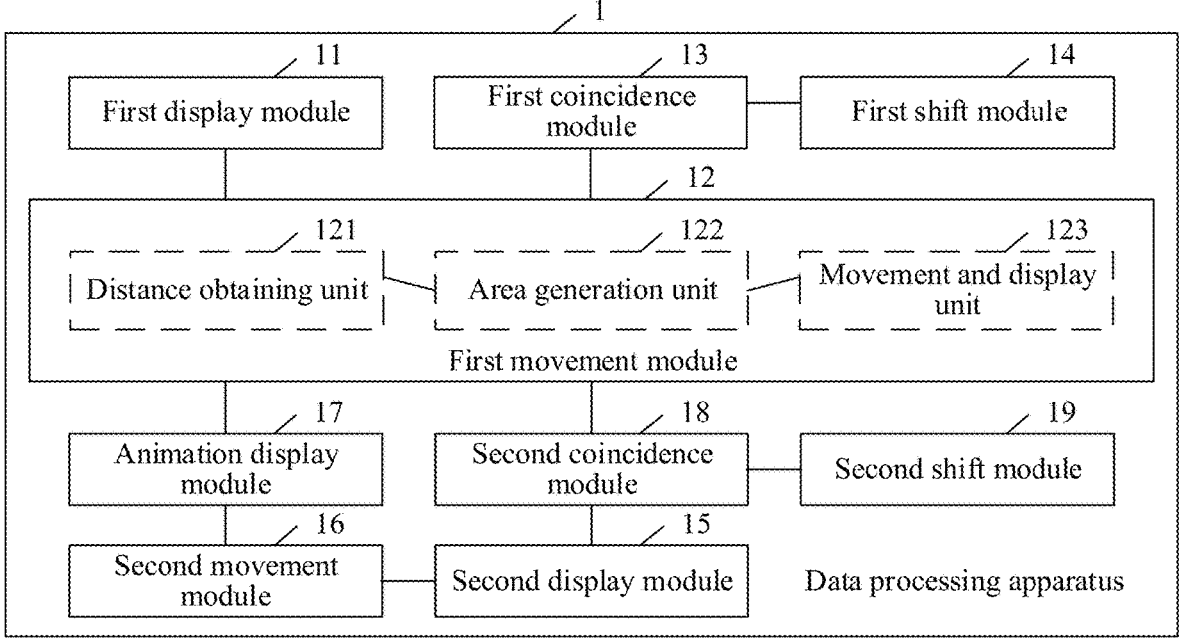
FIG. 20 is a schematic structural diagram of a data processing apparatus according to an embodiment of this application.

Further, FIG. 20 is a schematic structural diagram of a data processing apparatus according to an embodiment of this application. The data processing apparatus 1 may include: a first display module 11 and a first movement module 12. Further, the data processing apparatus 1 may further include: a first coincidence module 13, a first shift module 14, a second display module 15, a second movement module 16, an animation display module 17, a second coincidence module 18, and a second shift module 19.

The first display module 11 is configured to: in a case that a first interaction message is displayed on an interaction interface, display a first virtual object in a first interaction area in which the first interaction message is located, and display a resource object at a target location on the interaction interface. The first interaction message is transmitted by a first object. Both the first virtual object and the resource object are associated with the first interaction message. The resource object and the first virtual object have an interaction function.

The first display module 11 is specifically configured to: in a case that the first interaction message is displayed on the interaction interface and the first interaction message includes key message data with a virtual object trigger function, obtain the first virtual object indicated by the key message data and a validity time range from a resource library. The resource library is periodically obtained by an application client to which the interaction interface belongs.

The first display module 11 is specifically configured to: in a case that current time is within the validity time range, display the first virtual object in the first interaction area in which the first interaction message is located.

The first movement module 12 is configured to display, on the interaction interface, interactive movement involving the first virtual object and the resource object. The interactive movement includes moving the first virtual object from a location of the first interaction area, and/or moving the resource object from the target location.

The interaction interface includes a virtual keyboard area and a message display area. The message display area is an area other than the virtual keyboard area on the interaction interface.

The first movement module 12 is specifically configured to move and display the first virtual object from the location of the first interaction area, and move the resource object from the target location.

The first movement module 12 is specifically configured to: in a case that the resource object in movement is located in the message display area, display the resource object in the message display area.

The first movement module 12 is specifically configured to: in a case that the resource object in movement is located in the virtual keyboard area, display the resource object under a virtual keyboard in the virtual keyboard area.

The first movement module 12 includes: a distance obtaining unit 121, an area generation unit 122, and a movement and display unit 123.

The distance obtaining unit 121 is configured to obtain an object location distance between a display location of a first virtual object and a display location of a resource object.

The area generation unit 122 is configured to generate, on an interaction interface, a virtual area indicated by the object location distance.

The movement and display unit 123 is configured to move and display the first virtual object based on the virtual area from the location of the first interaction area.

The movement and display unit 123 is specifically configured to determine, in the virtual area, a target moving track and an auxiliary moving track corresponding to the first virtual object. The target moving track is used for indicating that there is a coincident display location between a display location of the first virtual object in movement and a display location of the resource object in movement. The auxiliary moving track is different from the target moving track. Starting points of both the target moving track and the auxiliary moving track are the location of the first interaction area on the interaction interface.

The movement and display unit 123 is specifically configured to select a selected moving track based on selection probabilities respectively corresponding to the target moving track and the auxiliary moving track. The selected moving track is the target moving track or the auxiliary moving track.

The movement and display unit 123 is specifically configured to move and display the first virtual object based on the selected moving track from the location of the first interaction area.

Optionally, the movement and display unit 123 is further configured to count a first consecutive non-collision count of a historical virtual object against the resource object in a target time period. The historical virtual object is associated with a historical interaction message on the interaction interface.

The movement and display unit 123 is further specifically configured to: in a case that the first consecutive non-collision count is equal to a collision trigger threshold, adjust a selection probability corresponding to the target moving track to a maximum selection probability.

The movement and display unit 123 is further specifically configured to determine the target moving track as the selected moving track based on the maximum selection probability corresponding to the target moving track and a selection probability corresponding to the auxiliary moving track.

Optionally, the movement and display unit 123 is further specifically configured to recount the first consecutive non-collision count in a case that the display location of the first virtual object is above the display location of the resource object.

Optionally, the first virtual object performs at least two jump actions during movement and display, the jump actions are respectively performed based on different selected moving tracks, and the selected moving tracks respectively corresponding to the jump actions are determined based on different virtual areas.

The movement and display unit 123 is further specifically configured to count a second consecutive non-collision count of consecutive non-collision jump actions of the first virtual object against the resource object.

The movement and display unit 123 is further specifically configured to: in a case that the second consecutive non-collision count is equal to a collision trigger threshold, generate an updated virtual area based on the display location of the first virtual object in movement and the display location of the resource object in movement. The updated virtual area includes an updated target moving track and an updated auxiliary moving track. The updated target moving track is used for indicating that there is a coincident display location between the display location of the first virtual object in movement and the display location of the resource object in movement. The updated auxiliary moving track is different from the updated target moving track. The updated target moving track has a maximum selection probability, and a selection probability corresponding to the updated auxiliary moving track being less than the maximum selection probability.

The movement and display unit 123 is further specifically configured to determine the updated target moving track as an updated selected moving track based on the maximum selection probability corresponding to the updated target moving track and the selection probability corresponding to the updated auxiliary moving track.

The movement and display unit 123 is further specifically configured to perform, on the first virtual object, a jump action indicated by the updated selected moving track.

For specific implementations of the distance obtaining unit 121, the area generation unit 122, and the movement and display unit 123, refer to the descriptions of S203 in the embodiment corresponding to FIG. 5 and the descriptions of S2031 to S2035 in the embodiment corresponding to FIG. 10. Details are not described herein again.

Optionally, the first coincidence module 13 is configured to: in a case that the interactive movement includes joint movement of the first virtual object and the resource object, trigger the first virtual object to perform an interactive action with respect to the resource object in a case that a display location of the first virtual object in movement coincides with a display location of the resource object in movement during the joint movement. A location of the resource object is shifted on the interaction interface based on the interactive action.

The first shift module 14 is configured to display, at a display location of the resource object whose location has been shifted, a first resource sub-object matching the first interaction message. The first resource sub-object has a function of moving on the interaction interface.

The first shift module 14 is configured to continue to move and display, on the interaction interface, the resource object whose location has been shifted.

Optionally, the second display module 15 is configured to: in a case that a second interaction message is displayed on the interaction interface, display a second virtual object in a second interaction area in which the second interaction message is located. The second interaction message is transmitted by a second object. The second virtual object is associated with the second interaction message. The second object is an object interacting with the first object on the interaction interface.

The second display module 15 is specifically configured to: in a case that the second interaction message is displayed on the interaction interface, determine trigger types respectively indicated by the first interaction message and the second interaction message.

The second display module 15 is specifically configured to: in a case that a trigger type indicated by the first interaction message and a trigger type indicated by the second interaction message are both an interactive type, display the second virtual object in the second interaction area in which the second interaction message is located.

The second movement module 16 is configured to move and display, on the interaction interface, the second virtual object from a location of the second interaction area. The first virtual object, the second virtual object, and the resource object are all displayed on the interaction interface.

Optionally, the animation display module 17 is configured to: in a case that the interactive movement includes joint movement of the first virtual object and the second virtual object, and in a case that a display location of the first virtual object in movement coincides with a display location of the second virtual object in movement during the joint movement, display, on the interaction interface, a coincident interactive animation associated with the first virtual object and the second virtual object.

Optionally, the second coincidence module 18 is configured to: in a case that the interactive movement includes joint movement of the first virtual object, the second virtual object, and the resource object, and in a case that a display location of the second virtual object in movement coincides with a display location of the resource object in movement during the joint movement, trigger the second virtual object to perform the interactive action with respect to the resource object. A location of the resource object is shifted on the interaction interface based on the interactive action.

The second shift module 19 is configured to display, at a display location of the resource object whose location has been shifted, a second resource sub-object matching the second interaction message. The second resource sub-object has a function of moving on the interaction interface.

The second shift module 19 is configured to continue to move and display, on the interaction interface, the resource object whose location has been shifted.

Optionally, the data processing apparatus 1 is further specifically configured to: in a case that the resource object whose location has been shifted exceeds a display range of the interaction interface, display, at a location at which the resource object disappears, the first resource sub-object matching the first interaction message; and the data processing apparatus 1 is further specifically configured to: in a case that the resource object whose location has been shifted is within a display range of the interaction interface, perform the step of displaying, at a display location of the resource object whose location has been shifted, a first resource sub-object matching the first interaction message.

Optionally, the data processing apparatus 1 is further specifically configured to display a resource acquisition area on the interaction interface in response to a trigger operation performed on the resource object in movement;

the data processing apparatus 1 is further specifically configured to display resource description information and a resource acquisition control in the resource acquisition area; and the data processing apparatus 1 is further specifically configured to acquire a virtual resource indicated by resource description information in response to a trigger operation performed on the resource acquisition control.

Optionally, the data processing apparatus 1 is further specifically configured to: in response to a trigger operation performed on the first virtual object in movement, obtain updated moving track and an updated moving speed indicated by the trigger operation; and the data processing apparatus 1 is further specifically configured to update an initial moving track and an initial moving speed of the first virtual object on the interaction interface based on the updated moving track and the updated moving speed.

Optionally, the data processing apparatus 1 is further specifically configured to add a virtual detection area for the first virtual object, and add a resource detection area for the resource object;

the data processing apparatus 1 is further specifically configured to: during movement of the first virtual object and the resource object, generate an area-coincidence degree between the virtual detection area and the resource detection area based on area intersection and an area union between the virtual detection area and the resource detection area; and the data processing apparatus 1 is further specifically configured to: in a case that the area-coincidence degree is greater than a coincidence degree threshold, determine that the display location of the first virtual object in movement coincides with the display location of the resource object in movement.

For specific implementations of the first display module 11 and the first movement module 12, refer to the descriptions of S101 and S102 in the embodiment corresponding to FIG. 3. Details are not described herein again. For specific implementations of the first coincidence module 13 and the first shift module 14, refer to the descriptions of S201 to S204 in the embodiment corresponding to FIG. 5 and the descriptions of S2031 to S2035 in the embodiment corresponding to FIG. 10. Details are not described herein again. For specific implementations of the second display module 15, the second movement module 16, and the animation display module 17, refer to the descriptions of S301 to S305 in the embodiment corresponding to FIG. 13. Details are not described herein again. For specific implementations of the second coincidence module 18 and the second shift module 19, refer to the descriptions of S401 and S409 in the embodiment corresponding to FIG. 16. Details are not described herein again. In addition, beneficial effects of the same method are not described herein again.

Figure 21:
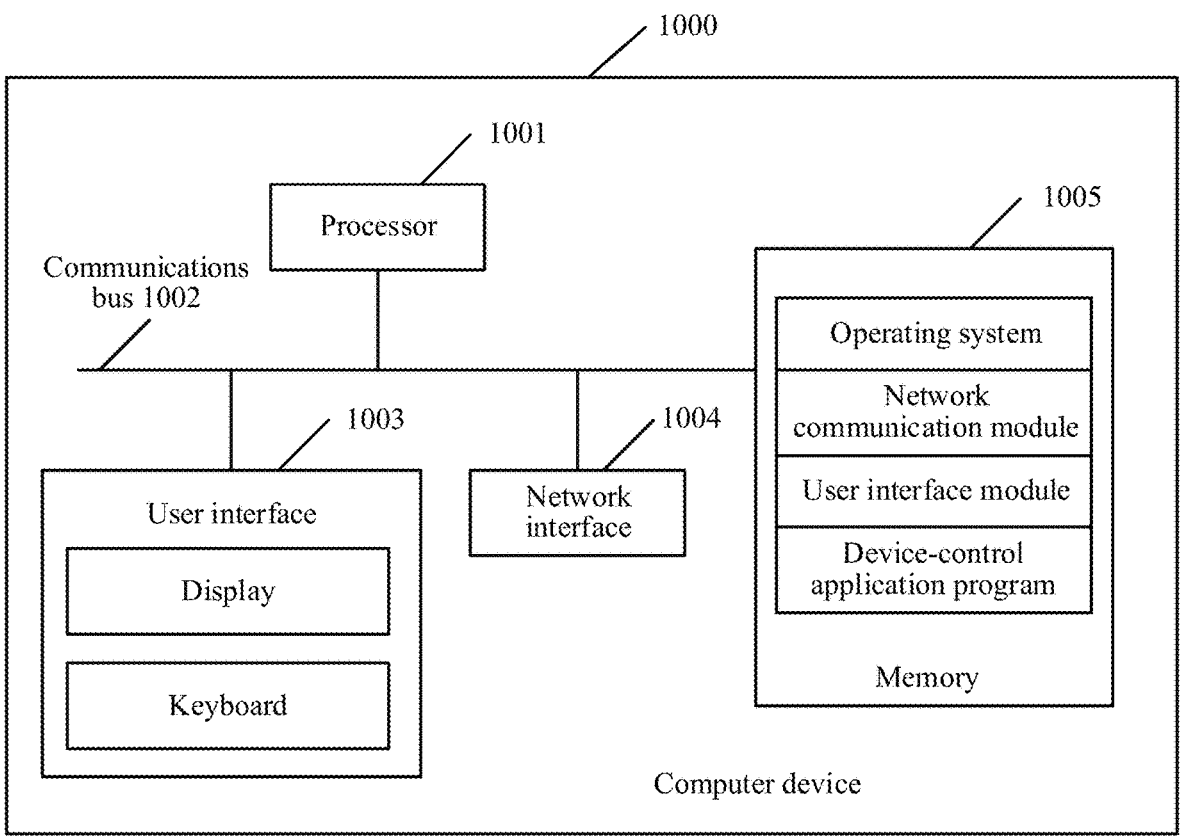
FIG. 21 is a schematic structural diagram of a computer device according to an embodiment of this application.

Further, FIG. 21 is a schematic structural diagram of a computer device according to an embodiment of this application. As shown in FIG. 21, the computer device 1000 may include: a processor 1001, a network interface 1004, and a memory 1005. In addition, the computer device 1000 may further include: a user interface 1003 and at least one communications bus 1002. The communications bus 1002 is configured to implement connection and communication between these components. In some embodiments, the user interface 1003 may include a display and a keyboard. Optionally, the user interface 1003 may further include a standard wired interface and a standard wireless interface. Optionally, the network interface 1004 may include a standard wired interface and a standard wireless interface (for example, a Wi-Fi interface). The memory 1005 may be a high-speed RAM memory, or may be a non-volatile memory, for example, at least one magnetic disk memory. Optionally, the memory 1005 may alternatively be at least one storage apparatus located away from the processor 1001. As shown in FIG. 21, the memory 1005 used as a computer-readable storage medium may include an operating system, a network communication module, a user interface module, and a device-control application program.

In the computer device 1000 shown in FIG. 21, the network interface 1004 may provide a network communication function, the user interface 1003 is mainly configured to provide an input interface for a user, and the processor 1001 may be configured to invoke the device-control application program stored in the memory 1005 to implement the following operations:

in a case that a first interaction message is displayed on an interaction interface, displaying a first virtual object in a first interaction area in which the first interaction message is located, and displaying a resource object at a target location on the interaction interface, the first interaction message being transmitted by a first object, both the first virtual object and the resource object being associated with the first interaction message, and the resource object and the first virtual object having an interaction function; and moving and displaying, on the interaction interface, the first virtual object from a location of the first interaction area, and moving and displaying the resource object from the target location.

The computer device 1000 described in this embodiment of this application may perform the descriptions of the data processing method in the embodiments corresponding to FIG. 3, FIG. 5, FIG. 10, FIG. 13, and FIG. 16, or may perform the descriptions of the data processing apparatus 1 in the embodiment corresponding to FIG. 20. Details are not described herein again. In addition, beneficial effects of the same method are not described herein again.

In addition, an embodiment of this application further provides a computer-readable storage medium. The computer-readable storage medium stores a computer program to be executed by the data processing apparatus 1, and the computer program includes program instructions. When the program instructions are executed by a processor, the descriptions of the data processing method in the embodiments corresponding to FIG. 3, FIG. 5, FIG. 10, FIG. 13, and FIG. 16 can be performed. Therefore, details are not described herein again. In addition, beneficial effects of the same method are not described herein again. For technical details that are not disclosed in the computer-readable storage medium embodiments of this application, refer to the descriptions of the method embodiments of this application.

In addition, an embodiment of this application further provides a computer program product or a computer program, where the computer program product or the computer program may include computer instructions, and the computer instructions may be stored in a computer-readable storage medium. A processor of a computer device reads the computer instructions from the computer-readable storage medium, and the processor may execute the computer instructions, so that the computer device performs the descriptions of the data processing method in the embodiments corresponding to FIG. 3, FIG. 5, FIG. 10, FIG. 13, and FIG. 16. Therefore, details are not described herein again. In addition, beneficial effects of the same method are not described herein again. For technical details that are not disclosed in the computer program product or computer program embodiments of this application, refer to the descriptions of the method embodiments of this application.

A person of ordinary skill in the art may understand that all or some of the processes of the methods in the foregoing embodiments may be implemented by a computer program instructing relevant hardware. The computer program may be stored in a computer-readable storage medium. When the program is run, the processes in the foregoing method embodiments may be included. The storage medium may be a magnetic disk, an optical disc, a read-only memory (ROM), a random access memory (RAM), or the like.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A data processing method, performed by a computer device, comprising:

in response to an interaction message being displayed on an interaction interface, displaying a virtual object in an interaction area in which the interaction message is located, and displaying a resource object at a target location on the interaction interface, the virtual object and the resource object being associated with the interaction message, and the resource object and the virtual object being configured to interact with each other;

displaying, on the interaction interface, interactive movement involving the virtual object and the resource object, the interactive movement including at least one of:

moving the virtual object from a location of the interaction area; or moving the resource object from the target location; and during the interactive movement, controlling the virtual object to perform an interactive action with respect to the resource object in response to a display location of the virtual object coinciding with a display location of the resource object, a location of the resource object being shifted on the interaction interface based on the interactive action;

displaying, at the display location of the resource object after being shifted, a first resource sub-object matching the interaction message, the first resource sub-object being capable of moving on the interaction interface; and continuing to move and display, on the interaction interface, the resource object.

2. The method according to claim 1, further comprising:

in response to the resource object moving out of a display range of the interaction interface after being shifted, displaying, at a location at which the resource object disappears, the first resource sub-object; or in response to the resource object remaining within the display range of the interaction interface after being shifted, performing displaying the first resource sub-object at the display location of the resource object after being shifted.

3. The method according to claim 1, further comprising:

adding a virtual detection area for the virtual object, and adding a resource detection area for the resource object;

during movement of the virtual object and the resource object, generating an area-coincidence degree between the virtual detection area and the resource detection area based on an area intersection and an area union between the virtual detection area and the resource detection area; and in response to the area-coincidence degree being greater than a coincidence degree threshold, determining that the display location of the virtual object in movement coincides with the display location of the resource object in movement.

4. The method according to claim 1, wherein the interaction message is a first interaction message, the virtual object is a first virtual object, and the interaction area is a first interaction area;

the method further comprising:

in response to a second interaction message being displayed on the interaction interface, displaying a second virtual object in a second interaction area in which the second interaction message is located, the second virtual object being associated with the second interaction message, and the second object being configured to interact with the first object on the interaction interface;

wherein displaying the interactive movement includes:

displaying, on the interaction interface, interactive movement involving the first virtual object, the second virtual object, and the resource object, the interactive movement involving the first virtual object, the second virtual object, and the resource object includes at least one of:

moving the first virtual object from the location of the first interaction area, and moving the resource object from the target location; or moving the second virtual object from a location of the second interaction area.

5. The method according to claim 4, wherein the interactive movement includes joint movement of the first virtual object and the second virtual object;

the method further comprising:

in response to the display location of the first virtual object in movement coincides with a display location of the second virtual object in movement during the joint movement, displaying, on the interaction interface, a coincident interactive animation associated with the first virtual object and the second virtual object.

6. The method according to claim 4, wherein the method further comprises:

wherein the interactive movement includes joint movement of the first virtual object, the second virtual object, and the resource object;

the method further comprising, in response to a display location of the second virtual object in movement coinciding with the display location of the resource object in movement during the joint movement:

triggering the second virtual object to perform an interactive action with respect to the resource object, a location of the resource object being shifted on the interaction interface based on the interactive action;

displaying, at the display location of the resource object after being shifted, a second resource sub-object matching the second interaction message, the second resource sub-object being capable of moving on the interaction interface; and continuing to move and display, on the interaction interface, the resource object.

7. The method according to claim 4, wherein displaying the second virtual object in the second interaction area includes:

in response to the second interaction message being displayed on the interaction interface, determining trigger types respectively indicated by the first interaction message and the second interaction message; and in response to a trigger type indicated by the first interaction message and a trigger type indicated by the second interaction message being both an interactive type, displaying the second virtual object in the second interaction area.

8. The method according to claim 1, further comprising:

displaying a resource acquisition area on the interaction interface in response to a trigger operation performed on the resource object in movement;

displaying resource description information and a resource acquisition control in the resource acquisition area; and acquiring a virtual resource indicated by the resource description information in response to a trigger operation performed on the resource acquisition control.

9. The method according to claim 1, further comprising:

in response to a trigger operation performed on the virtual object in movement, obtaining an updated moving track and an updated moving speed indicated by the trigger operation; and updating an initial moving track and an initial moving speed of the virtual object on the interaction interface based on the updated moving track and the updated moving speed.

10. The method according to claim 1, wherein:

the interaction interface includes a virtual keyboard area and a message display area that do not overlap with each other; and the interactive movement includes moving the resource object from the target location, and displaying the interactive movement includes:

in response to the resource object in movement being located in the message display area, displaying the resource object in the message display area; or in response to the resource object in movement being located in the virtual keyboard area, covering the resource object using a virtual keyboard in the virtual keyboard area.

11. The method according to claim 1, wherein displaying the virtual object in the interaction area includes:

in response to the interaction message being displayed on the interaction interface and the interaction message includes key message data with a virtual object trigger function, obtaining, from a resource library, the virtual object indicated by the key message data and a validity time range, the resource library being periodically obtained by an application client to which the interaction interface belongs; and in response to a current time being within the validity time range, displaying the virtual object in the interaction area.

12. The method according to claim 1, wherein:

the interactive movement includes moving the virtual object from the location of the interaction area; and displaying the interactive movement includes:

obtaining an object location distance between a display location of the virtual object and a display location of the resource object;

generating, on the interaction interface, a virtual area indicated by the object location distance; and moving and displaying the virtual object based on the virtual area from a location of the interaction area.

13. The method according to claim 12, wherein moving and displaying the virtual object based on the virtual area from the location of the interaction area includes:

determining, in the virtual area, a target moving track and an auxiliary moving track corresponding to the virtual object, the target moving track being configured to indicate that a coincident display location exists between the display location of the virtual object in movement and the display location of the resource object in movement, the auxiliary moving track being different from the target moving track, and starting points of the target moving track and the auxiliary moving track being the location of the interaction area on the interaction interface;

selecting a selected moving track based on selection probabilities respectively corresponding to the target moving track and the auxiliary moving track, the selected moving track being the target moving track or the auxiliary moving track; and moving and displaying the virtual object based on the selected moving track from the location of the interaction area.

14. The method according to claim 13, further comprising:

counting a consecutive non-collision count of a historical virtual object against the resource object in a target time period, the historical virtual object being associated with a historical interaction message on the interaction interface; and in response to the consecutive non-collision count being equal to a collision trigger threshold, adjusting a selection probability corresponding to the target moving track to a maximum selection probability;

wherein selecting the selected moving track includes:

determining the target moving track as the selected moving track based on the maximum selection probability corresponding to the target moving track and a selection probability corresponding to the auxiliary moving track.

15. The method according to claim 14, further comprising:

recounting the consecutive non-collision count in response to the display location of the virtual object being above the display location of the resource object.

16. The method according to claim 13, wherein the virtual object performs at least two jump actions during movement and display, the jump actions are performed based on different selected moving tracks determined based on different virtual areas;

the method further comprising:

counting a consecutive non-collision count of consecutive non-collision jump actions of the virtual object against the resource object;

in response to the consecutive non-collision count being equal to a collision trigger threshold, generating an updated virtual area based on the display location of the first virtual object in movement and the display location of the resource object in movement, the updated virtual area including an updated target moving track and an updated auxiliary moving track, the updated target moving track being configured to indicate that a coincident display location exists between the display location of the virtual object in movement and the display location of the resource object in movement, the updated auxiliary moving track being different from the updated target moving track, the updated target moving track having a maximum selection probability, and a selection probability corresponding to the updated auxiliary moving track being less than the maximum selection probability;

determining the updated target moving track as an updated selected moving track based on the maximum selection probability corresponding to the updated target moving track and the selection probability corresponding to the updated auxiliary moving track; and performing, on the virtual object, a jump action indicated by the updated selected moving track.

17. A computer device comprising:

one or more memories storing one or more computer programs; and one or more processors configured to execute the one or more computer programs to:

in response to an interaction message being displayed on an interaction interface, display a virtual object in an interaction area in which the interaction message is located, and display a resource object at a target location on the interaction interface, the virtual object and the resource object being associated with the interaction message, and the resource object and the virtual object being configured to interact with each other;

display, on the interaction interface, interactive movement involving the virtual object and the resource object, the interactive movement including at least one of:

moving the virtual object from a location of the interaction area; or moving the resource object from the target location; and during the interactive movement, control the virtual object to perform an interactive action with respect to the resource object in response to a display location of the virtual object coinciding with a display location of the resource object, a location of the resource object being shifted on the interaction interface based on the interactive action;

display, at the display location of the resource object after being shifted, a first resource sub-object matching the interaction message, the first resource sub-object being capable of moving on the interaction interface; and continue to move and display, on the interaction interface, the resource object.

18. A non-transitory computer-readable storage medium storing one or more computer programs that, when executed by one or more processors, cause the one or more processor performs to:

in response to an interaction message being displayed on an interaction interface, display a virtual object in an interaction area in which the interaction message is located, and display a resource object at a target location on the interaction interface, the virtual object and the resource object being associated with the interaction message, and the resource object and the virtual object being configured to interact with each other; and display, on the interaction interface, interactive movement involving the virtual object and the resource object, the interactive movement including at least one of:

moving the virtual object from a location of the interaction area; or moving the resource object from the target location; and during the interactive movement, control the virtual object to perform an interactive action with respect to the resource object in response to a display location of the virtual object coinciding with a display location of the resource object, a location of the resource object being shifted on the interaction interface based on the interactive action;

display, at the display location of the resource object after being shifted, a first resource sub-object matching the interaction message, the first resource sub-object being capable of moving on the interaction interface; and continue to move and display, on the interaction interface, the resource object.

* * * * *